United States Patent [19]
Uchida

[11] Patent Number: 5,461,486
[45] Date of Patent: Oct. 24, 1995

[54] APPARATUS FOR RECORDING AND REPRODUCING DIGITAL VIDEO SIGNAL

[75] Inventor: Hirofumi Uchida, Neyagawa, Japan

[73] Assignee: Matsushita Electric Industrial Co., Ltd., Kadoma, Japan

[21] Appl. No.: 160,886

[22] Filed: Dec. 3, 1993

[30] Foreign Application Priority Data

Dec. 4, 1992 [JP] Japan ................................. 4-325275

[51] Int. Cl.⁶ ................................................. H04N 5/783
[52] U.S. Cl. ............................ 358/335; 358/312; 360/32
[58] Field of Search ............................ 360/48, 33.1, 32, 360/10.1; 358/335, 310, 312; 348/384, 420; H04N 5/76, 5/783

[56] References Cited

U.S. PATENT DOCUMENTS

| | | | |
|---|---|---|---|
| 4,280,147 | 7/1981 | Baldwin | 360/10 |
| 4,796,110 | 1/1989 | Glass et al. | |
| 4,969,055 | 11/1990 | Oberjatzas et al. | |
| 5,023,710 | 6/1991 | Kondo et al. | 358/335 |
| 5,130,861 | 7/1992 | Suma | |
| 5,136,391 | 8/1992 | Minami | 358/310 |
| 5,144,500 | 9/1992 | Odaka et al. | |
| 5,144,501 | 9/1992 | Inazawa et al. | |
| 5,237,424 | 8/1993 | Nishino et al. | 358/310 |

FOREIGN PATENT DOCUMENTS

| | | |
|---|---|---|
| 198168 | 4/1989 | Japan. |
| 2101677 | 4/1990 | Japan. |
| 3276470 | 12/1991 | Japan. |
| 4130883 | 5/1992 | Japan. |

*Primary Examiner*—Tommy P. Chin
*Assistant Examiner*—Huy Nguyen
*Attorney, Agent, or Firm*—Cushman, Darby & Cushman

[57] ABSTRACT

Digital video signal of one frame is converted to macro blocks which are arranged in a predetermined order in one rectangular block. The macro blocks are converted to synchronizing block data and are recorded in a predetermined number of tracks of a magnetic tape. In high speed reproducing operation, a tape running speed is selected to a reference speed at which scanning areas of the tracks of successive frames having the same track number are shifted in a direction every frame number, and video data which are on every other frame are arranged on the reproduced video image.

10 Claims, 31 Drawing Sheets

FIG. 17

|  |  | ... | N+2 | N+4 | ... |  |  |
|---|---|---|---|---|---|---|---|
|  |  | ... | N+1 | N+3 | ... |  |  |
|  |  |  | ... | N | N+2 | N+4 | ... |
|  |  |  | ... | N−1 | N+1 | N+3 | ... |
|  |  |  |  | ... | N | N+2 |  |
|  |  |  |  |  | ... | N+1 |  |
|  |  |  |  |  |  |  |  |
| N+4 | ... |  |  |  |  |  |  |
| N+1 | N+3 | ... |  |  |  |  |  |
| N | N+2 | N+4 | ... |  |  |  |  |

157 points to upper region, 156 points to lower region.

(NTSC)

(NTSC)

(NTSC)

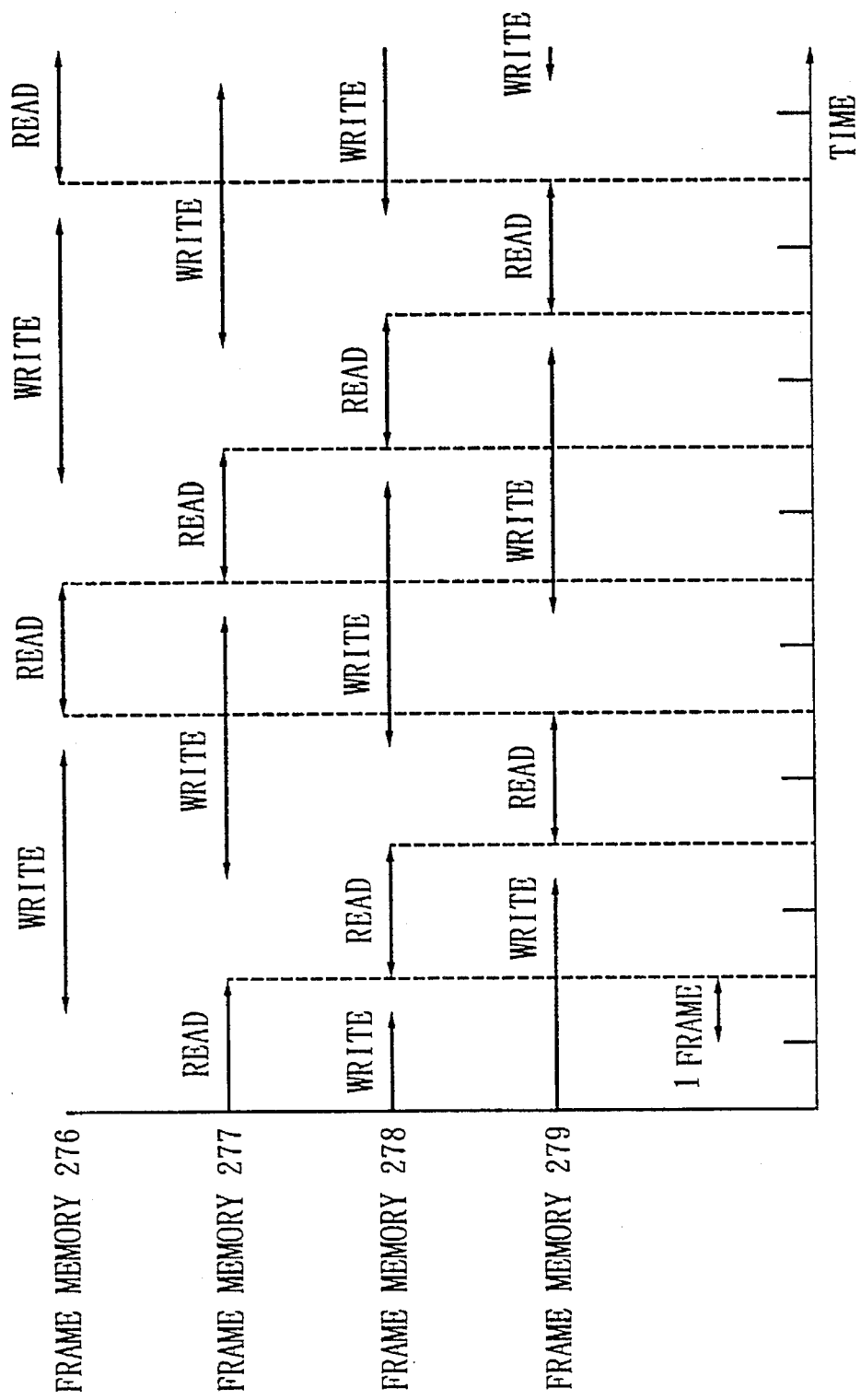

APPARATUS FOR RECORDING AND REPRODUCING DIGITAL VIDEO SIGNAL

BACKGROUND OF THE INVENTION

1. Field of the Invention

The present invention relates generally to an apparatus for recording and reproducing a video signal, and, more particularly, to an apparatus for recording and reproducing a digital video signal which is capable of high speed reproduction of a recorded digital video signal.

2. Description of the Related Art

In an apparatus for recording and reproducing a digital video signal (hereinafter referred to as a digital VTR), the amount of data to be recorded is far more than that in an apparatus for recording and reproducing an analog video signal. Therefore, in the digital VTR, data of an image signal of one field is recorded in plural video tracks of a magnetic tape. For example, in the digital VTR of D-1 format (one of International Standard of the digital VTR), the data of the image signal of one field is recorded in ten video tracks in order to record the video signal of the NTSC Standard. In the D-1 format, prior to recording operation, the data of the video signal is shuffled for every unit of pixel in order to improve the error correction characteristic of the data to be recorded. The shuffled data of the video signal is recorded in the video tracks in the shuffled order.

In a high speed reproducing operation using the data of the video signal recorded as mentioned above, a reproduction image can be formed by using the data of video signal reproduced from the plural video tracks which are not remotely located with respect to each other in the running direction of the magnetic tape. Moreover, since the data of the reproduced video signal is Interpolated in each unit of one pixel, a legible video image may be reproduced. However, in the above-mentioned recording and reproducing apparatus of the digital video signal, the image quality is deteriorated because the data of the video signals of plural fields are mixed in with the data of the video signal in the high speed reproduction operation.

In the high speed reproduction operation in the apparatus of the D-1 format, a digital recording and reproducing apparatus of the video signal for preventing intermingling of the video images of the plural fields in the reproduced image is disclosed in the U.S. Pat. No. 5,130,861. According to this reference, the video signal is converted to synchronizing blocks having a predetermined format, and the synchronizing blocks are recorded in the video tracks. During the reproducing operation, the synchronizing blocks are reproduced by reproducing heads, which are larger than the recording heads. Where the video signal recorded as mentioned above is reproduced at a tape speed of two times or three times the tape speed in recording operation, the entire video signal on the tape are detected by the reproducing heads and are stored in plural memories. Each memory corresponds to each one of plural fields, and a switching means controls the memories so that the data of each field is stored in a predetermined memory. The switching means is activated by detecting the synchronizing block. When a predetermined combination of ID pattern information is completed in the memory, reproduction of the data of the entire image signals of one field is determined, and the data of image signal of one field is output from the memory and is displayed as a video image. Consequently, the displayed video image is formed by the data of the video signal of the same field. As mentioned above, in the digital VTR using the D-1 format, the video image can be formed by the video signal of the same field in the high speed reproducing operation. In the prior art, only a part of the recorded data is produced during a high speed reproducing operation where the tape running speed exceeds ten times the tape running speed in the recording operation. Thus, high speed reproduction of the recorded data is impossible in such a high tape running speed.

Recently, data compression technology has been introduced in the digital VTR in order to reduce the amount of data in recording operation. A reference disclosing such technology is, for example, "An Experimental Study for a Home-use Digital VTR", IEEE Trans. on CE, Vol. 35, No. 3, pp. 450–457 (August 1989 by C. Yamamitsu, A. Ide, A. Iketani, T. Juri, S. Kadono, C. Matsumi, K. Matsushita and H. Mizuki). According this reference, the data in a region of 8 pixels in the horizontal direction and 8 lines in the vertical direction of the video image is defined as a DCT block (discrete cosine transform block), and the DCT block is used as a basic unit in data processing. In the data compression operation, an orthogonal transform operation is applied to the data of the DCT block, and subsequently, variable length coding operation is applied thereto.

The video signal data-compressed as mentioned above is recorded on the magnetic tape of the digital VTR. In the reproducing operation, the data is reproduced in units of one DCT block. When the video image recorded as mentioned above is reproduced at a high speed, the reproduced DCT blocks are intermingled with the DCT blocks having the data of image signals which are different in the recorded time. Therefore, a video image at a part in the video display is different from a video image at another part in the video display in the recorded times, and, as a result, an unsightly image is reproduced. The deterioration of the reproduced image is caused by the data compression in the recording operation and data interpolation in the reproducing operation. Namely, it is caused by an interpolation of the data block that is different from the original data with respect to a point of time. In general, when the data compression is applied in the recording operation which is operated in units of one data block, such as the DCT block, the lost data can not be interpolated with data which is located adjacent to the lost data in the video image, and the data which is used for the interpolation is different from the lost data adjacent in the time sequence such as data in the previous field or frame. The time difference between the lost data and the interpolation data increases as the speed ratio of a reproducing speed to the recording speed increases, and therefore, the quality of the reproduced image is further deteriorated.

OBJECT AND SUMMARY OF THE INVENTION

An object of the present invention is to provide an apparatus for recording and reproducing a digital video signal with improved image quality in the high speed reproduction of a recorded data of the image signal which is recorded by data compression operation.

The apparatus for recording and reproducing the digital video signal in accordance with the present invention comprises:

blocking means for converting video data to macro block data comprising a first predetermined number of data of pixels in the horizontal direction and a second predetermined number of data of pixels in the vertical direction of a video image, coding means for converting the macro block data to macro block coded data by data compression, synchronizing block data generation means for generating synchronizing block data including a main component of the macro block coded data, synchronizing block data arrangement means for dividing a video image of one frame into a third predetermined number of rectangular block, and for arranging the synchronizing block data, including the main component of the macro block coded data corresponding to a macro block, in the rectangular block in a predetermined order from one end of the video image to the other end thereof along the length of the rectangular block, recording means for recording the synchronizing block data of one rectangular block arranged in the predetermined order in video areas of one track of a magnetic tape running at a first running speed, and for recording the synchronizing block data of each rectangular block having the third predetermined number for the rectangular block number of the one frame in video areas of respective tracks having track numbers in one-to-one correspondence to the rectangular block numbers, the respective tracks being formed in parallel on the magnetic tape, reproducing means comprising a reproducing head for scanning the tracks of the magnetic tape for reproducing the recorded synchronizing block data, magnetic tape running speed control means for controlling a running speed of the magnetic tape at a second running speed having a predetermined ratio with respect to the first running speed, and being a running speed at which the areas on the tracks of the same track number of successive plural frames formed on the magnetic tape scanned by the reproducing head are shifted in a predetermined direction in every successive frame, output image generation means comprising memory means for storing the synchronizing block data reproduced from the magnetic tape by a write address control circuit and read address control means for reading out the stored synchronizing block data with a predetermined timing, the tape being driven at the second running speed, decoding means for decoding the synchronizing block data and converting to the macro block data, and deblocking means for converting the macro block data to video data.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG.17 is a diagram representing the data arrangement in a frame memory during the high speed reproduction operation of the digital recording and reproducing apparatus in the first embodiment;

FIG.25 is a timing chart illustrating the timing of write and read operations in the frame memories of the output image generation circuit of the fourth embodiment;

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
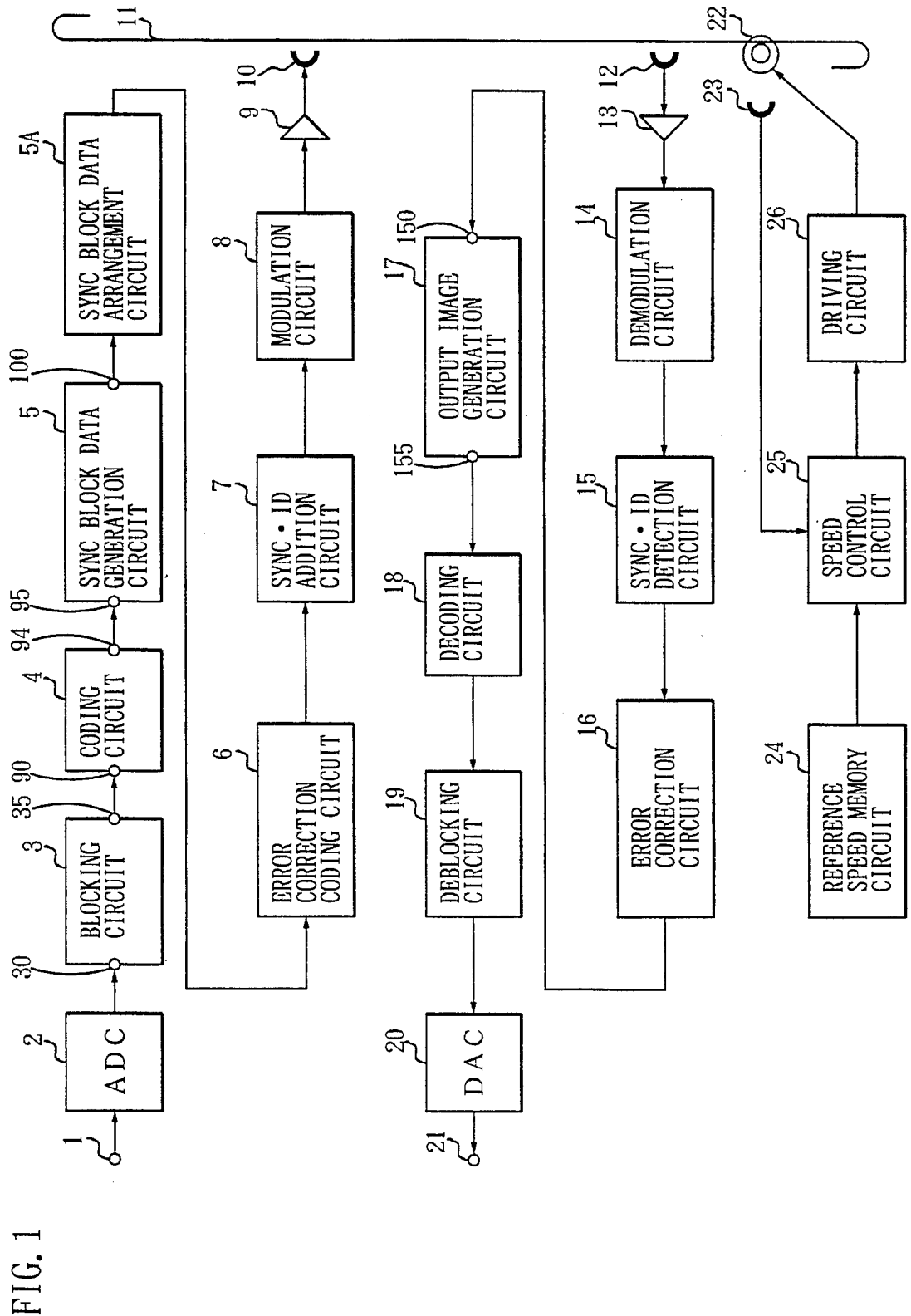
FIG.1 is a block diagram of a circuitry which is used in common with entire embodiments of the apparatus for recording and reproducing a digital video signal in accordance with the present invention.

FIG.1 is a block diagram of a circuit of the digital recording and reproducing apparatus in accordance with the present invention. The circuit shown in FIG.1 is applicable to all the embodiments of the digital recording and reproducing apparatus of the present invention by changing a part of the circuitry.

A digital VTR is provided with a known helical scanning mechanism, and a magnetic tape 11 is wrapped on a circumferential surface of a drum (not shown) by about 180 degrees of central angle. A rotating head 10 comprises two head elements mounted on one rotating mechanism with 180 degrees of central angle and different azimuth angles with respect to each other. The revolution speed of the rotating head 10 is 9000 rpm. A reproducing head 12 is also mounted on the same rotating mechanism in a manner similar to that of the recording head 10. The recording head 10 may be used for the reproducing head 12 for simplicity of the rotating mechanism.

The digital recording reproducing apparatus in accordance with the present invention is applicable to both the NTSC standard and the PAL standard. First, the application to the NTSC standard is elucidated.

[First embodiment (NTSC)]

An analog composite signal in a video signal is converted into an analog component signal by the a known decoder (not shown), and input to an input terminal 1 of the circuit shown in FIG.1. The component signal comprises a separated luminance signal Y, a separated color difference signal (R-Y) and a separated color difference signal (B-Y). The component signal is applied to an analog to digital converter 2 (hereinafter is referred to as an ADC), and is converted into a digital signal (image data) of the known 4:2:2 format.

Figure 2:
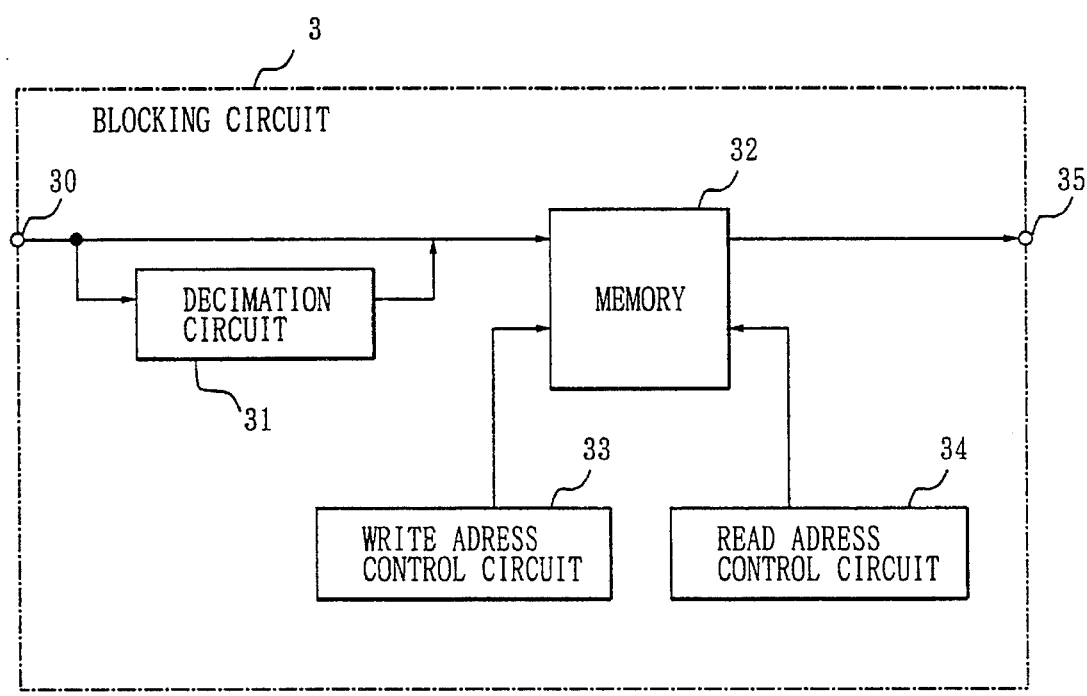
FIG.2 is a block diagram of a detailed circuitry of a blocking circuit in the circuitry of FIG. 1.

The digital signal in the 4:2:2 format is input to a blocking circuit 3. The detailed circuitry of the blocking circuit 3 is shown in FIG.2. Referring to FIG.2, the blocking circuit 3 comprises a decimation circuit 31, a memory 32, a write address control circuit 33 and a read address control circuit 34. Color difference data (R-Y) and (B-Y) of the video data input from terminal 30 are decimated In the decimation circuit 31, and the video data in 4:2:2 format is converted into video data having a 4:1:1 format. The video data in the 4:1:1 format is written in the memory 32 in compliance with a control signal output from the write address control circuit 33. The image data written in the memory 32 is read out from the memory 32 in compliance with a control signal output from the read address control circuit 34. The inputted video data is formed into a block by the write and read operations, and a resultant "block data" is output to a terminal 35 and is applied to a coding circuit 4. See FIG. 1.

Figure 3:
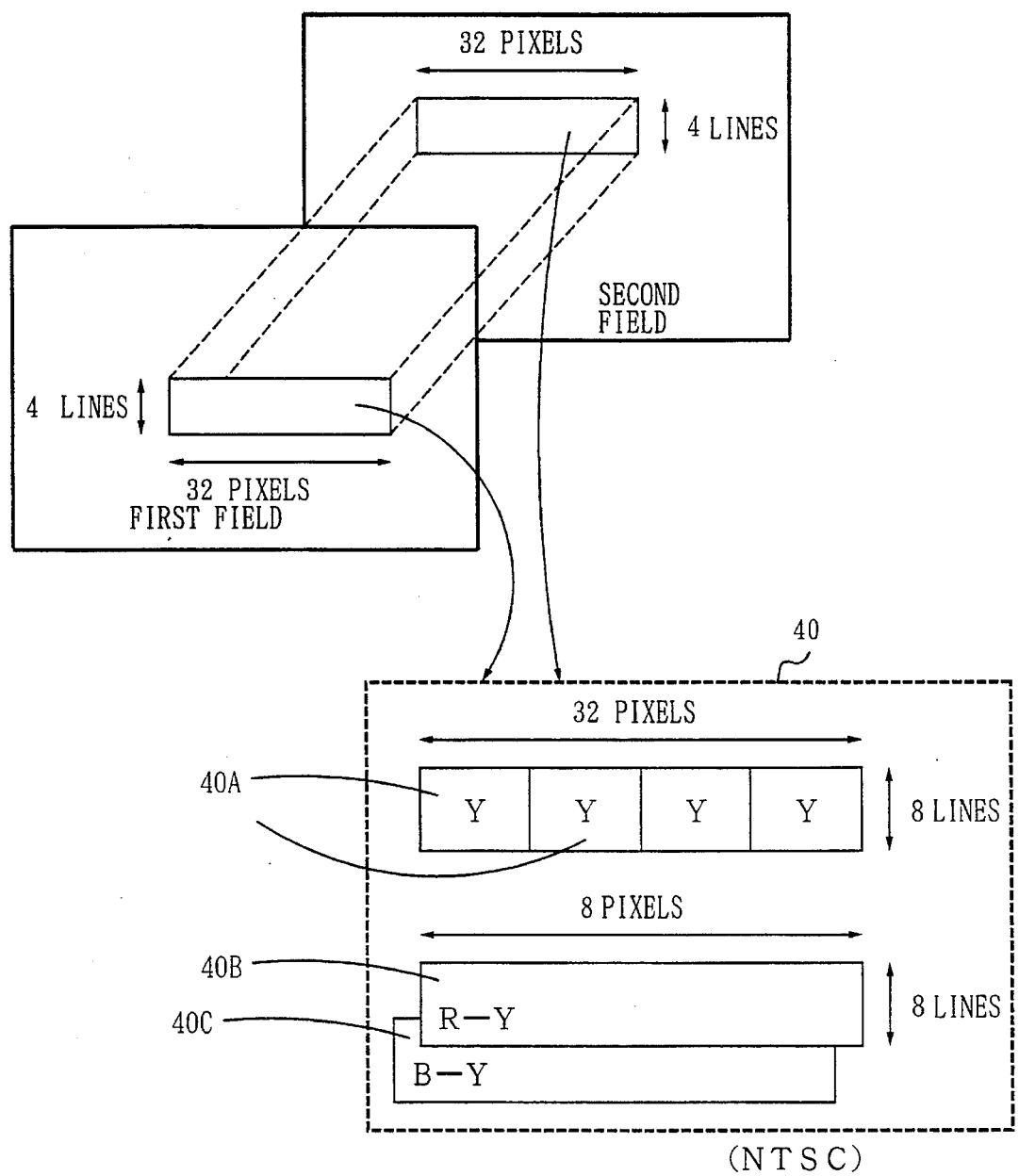
FIG.3 is a diagram of a macro block in the NTSC standard which is used in the digital recording and reproducing apparatus of the present invention.
Figure 4:
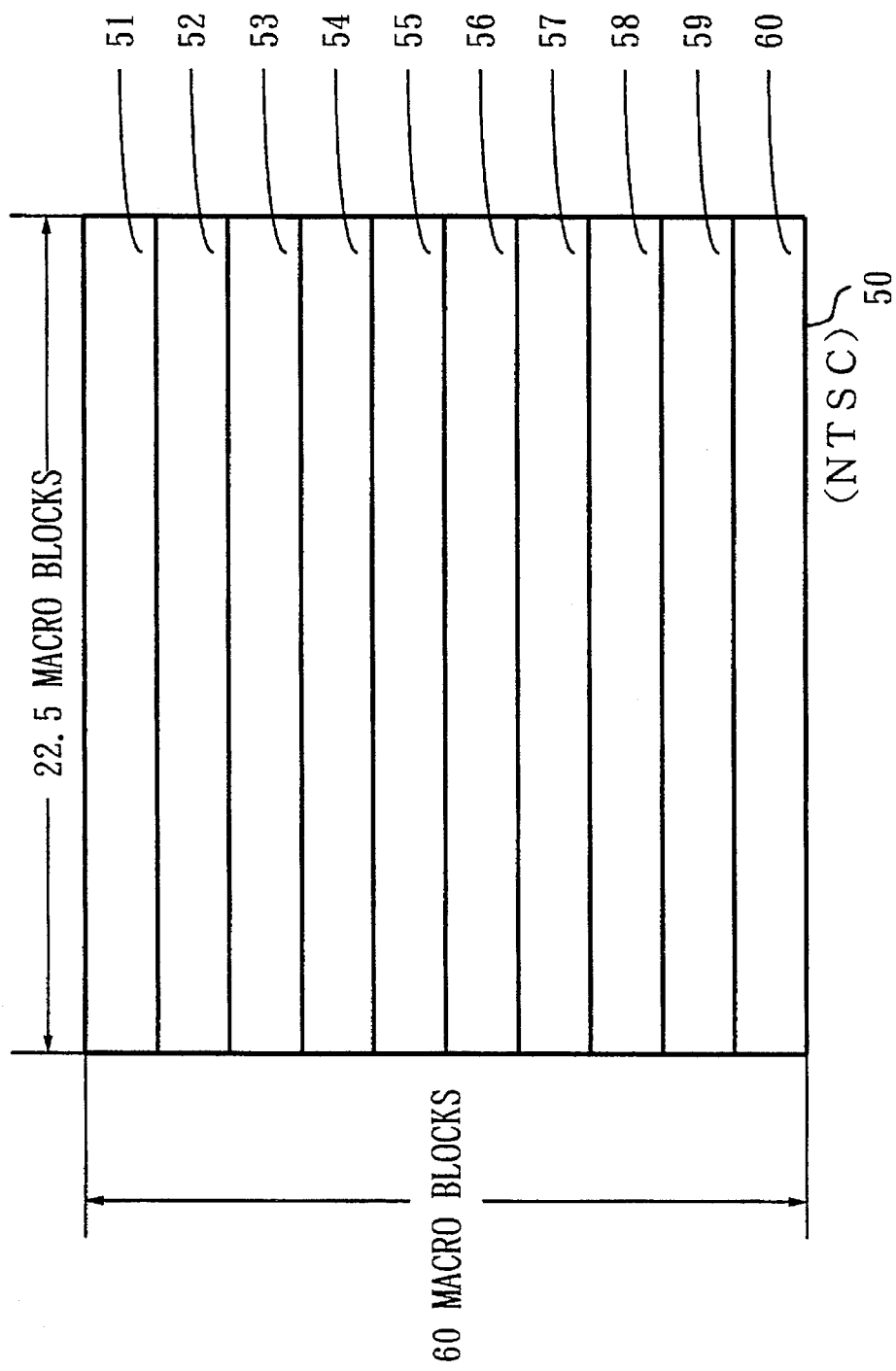
FIG.4 is a diagram representing rectangular blocks in the NTSC standard by which a video image is divided into plural rectangular blocks in the vertical direction of the video image in a first embodiment of the digital recording and reproducing apparatus in the present invention.

An example of a configuration of the block data in the NTSC standard is shown in FIG.3. A "macro block" having the data structure shown in FIG.3 is defined in the 4:1:1 format of the digital recording and reproducing apparatus. Referring to FIG.3, the video image of one frame comprising a first field and a second field is divided into a plurality of macro blocks 40. One macro block 40 is comprised of four DCT blocks 40A of the luminance signal Y, one DCT block 40B of the color difference signal (R-Y) and one DCT block 40C of the color difference signal (B-Y). One DCT block comprises horizontal data of 8 pixels and vertical data of 4 lines of each field, and consequently the number of data results in [8×4×2]. In general, when digital processing the video signal, the data of the luminance signal Y of one frame are represented by the product of the horizontal data of 720 pixels by the vertical data of 480 lines. On the other hand, each of the data of the color difference signals (R-Y) and (B-Y) of one frame is represented by the product of the horizontal data of 180 pixels by the vertical data of 480 lines. Therefore, as shown in FIG.4, the video image 50 of one frame has a length of 22.5 macro blocks in the horizontal direction and a length of 60 macro blocks in the vertical direction. Consequently, the video image 50 of one frame is divided into 1350 (22.5×60) macro blocks.

[Recording operation]

Figure 5:
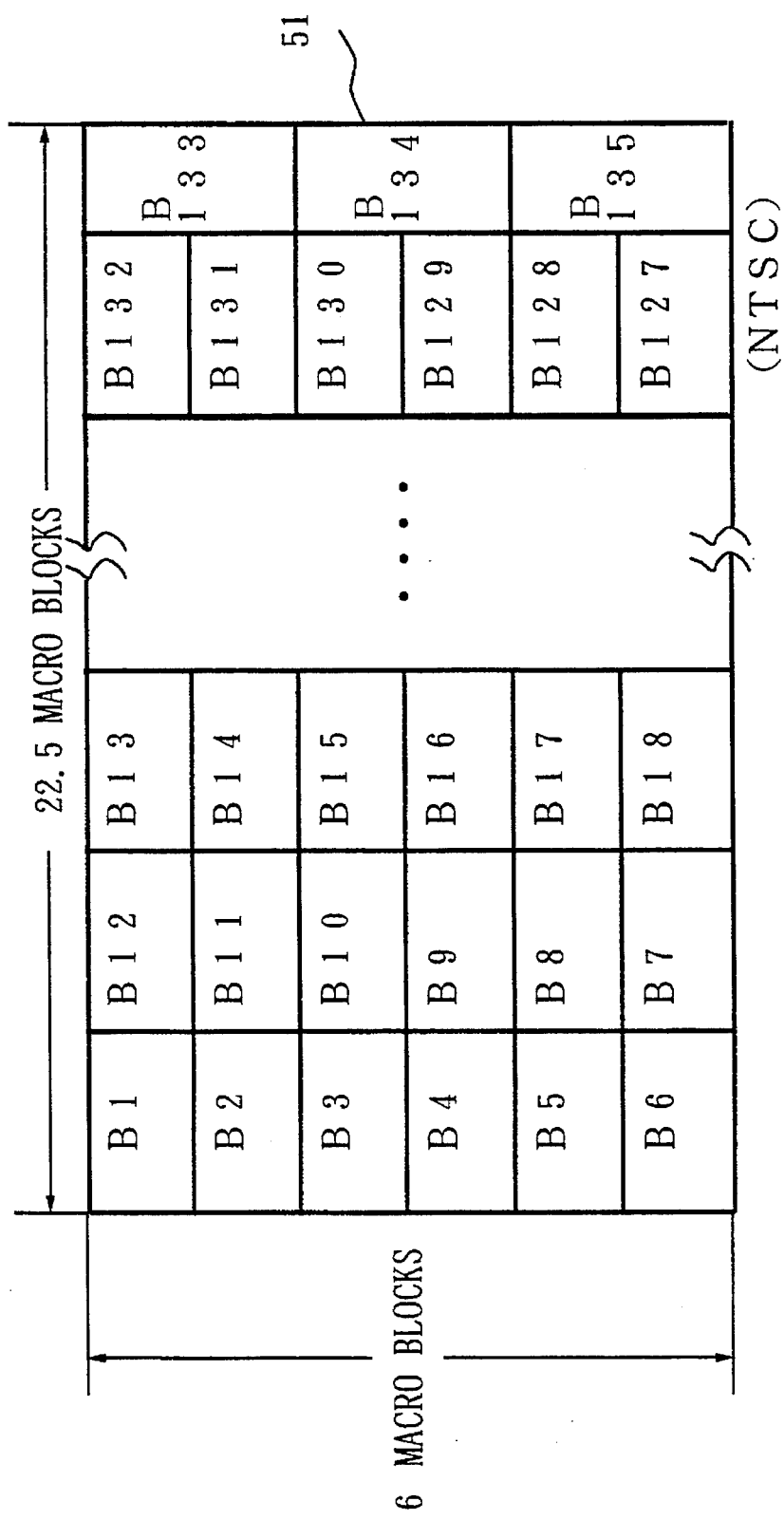
FIG.5 is a diagram representing the arrangement of macro blocks in the rectangular block in the NTSC standard in the first embodiment.

In a first embodiment of the recording and reproducing apparatus in accordance with the present invention, first, the video image 50 of one frame is divided into ten rectangular blocks 51–60 as shown in FIG.4. As shown in FIG.5, each of the rectangular blocks 51–60 comprises macro blocks, B1 through B135. Each of the macro blocks B1–B127 has the same structure as shown in FIG.3. In each of the macro blocks B133–B135, the luminance signal Y comprises the data of the product of the 32 pixels in the horizontal direction by 4 lines in the vertical direction in each field (the number of data results in 256 (16×8×2)). The last marks and numerals ×2 designate that each data consists of two fields of interlacing. On the other hand, each of the color difference signals (R-Y) and (B-Y) comprises the data of the product of 8 pixels in the horizontal direction by 4 lines in the vertical direction in each field. The block data configurated as mentioned above is inputted to the known coding circuit 4.

Figure 9:
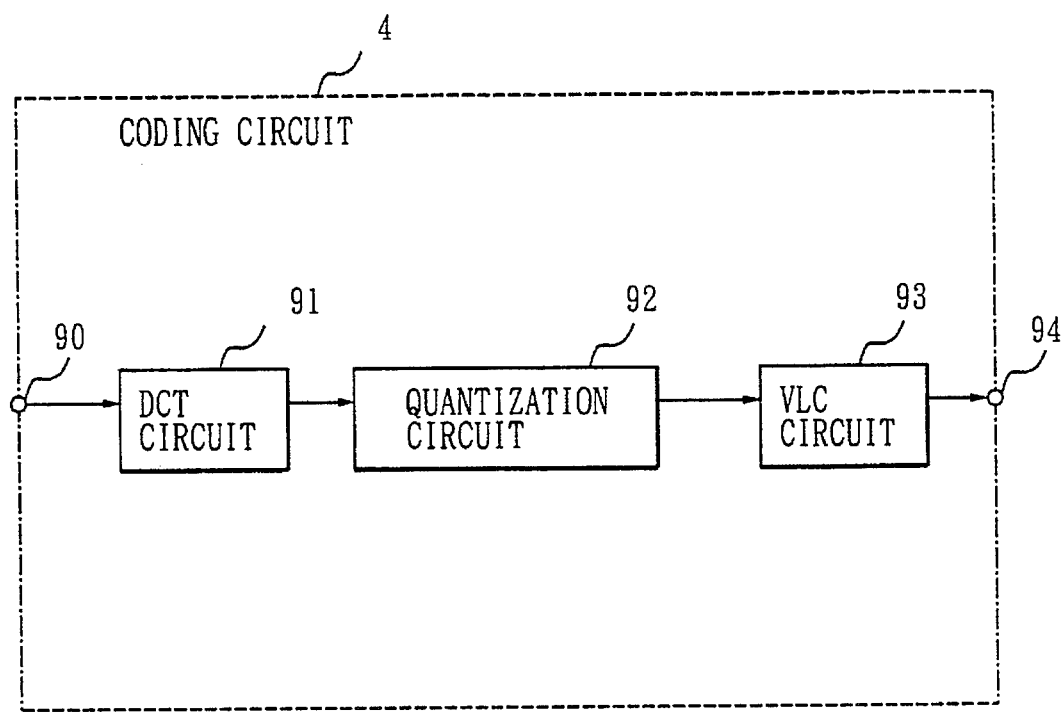
FIG.9 is a block diagram of a coding circuit of the digital recording and reproducing apparatus of the present invention.

A detailed configuration of the coding circuit 4 is shown in FIG.9. The coding circuit 4 comprises a DCT circuit 91 (discrete cosine transform circuit), a quantization circuit 92 and a VLC circuit 93 (variable length coding circuit). The block data input to a terminal 90 of the coding circuit 4 is transformed by the DCT circuit 91 and is applied to the quantization circuit 92. In the quantization circuit 92, first, an estimation operation for quantizing the block data is applied to the block data in order to limit the data length of coded data of five macro blocks, for example, to a predetermined data length. Subsequently, the block data is quantized in compliance with a value estimated in the estimation operation. The quantized block data is input to the VLC circuit 93, and is coded in a manner such that the data length of the block data of five macro blocks is always shorter than the predetermined value. The coded data is output to a terminal 94 and is inputted to a synchronizing block data generation circuit 5 (hereinafter is referred to as SYNC block data generation circuit 5).

Figure 10:
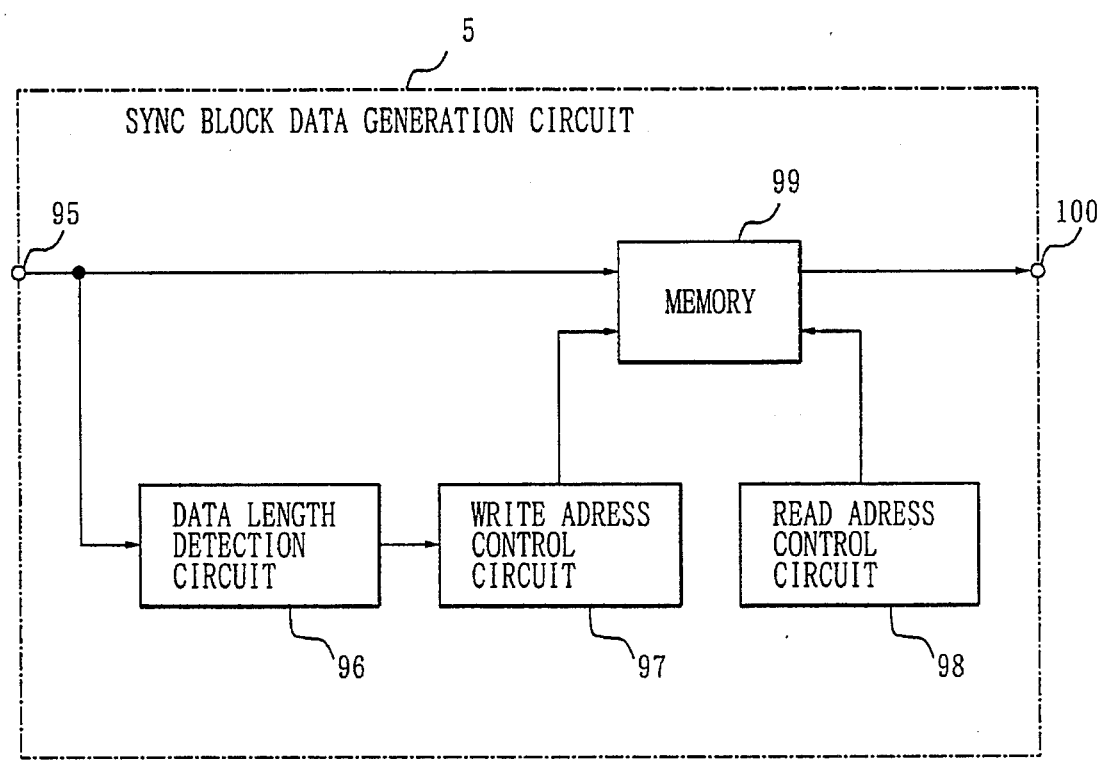
FIG.10 is a block diagram of a synchronizing block data generation circuit of the digital recording and reproducing apparatus of the present invention.

The SYNC block data generation circuit 5 as shown in FIG.10 comprises a data length detection circuit 96, a write address control circuit 97, a read address control circuit 98 and a memory 99.

Figure 11:
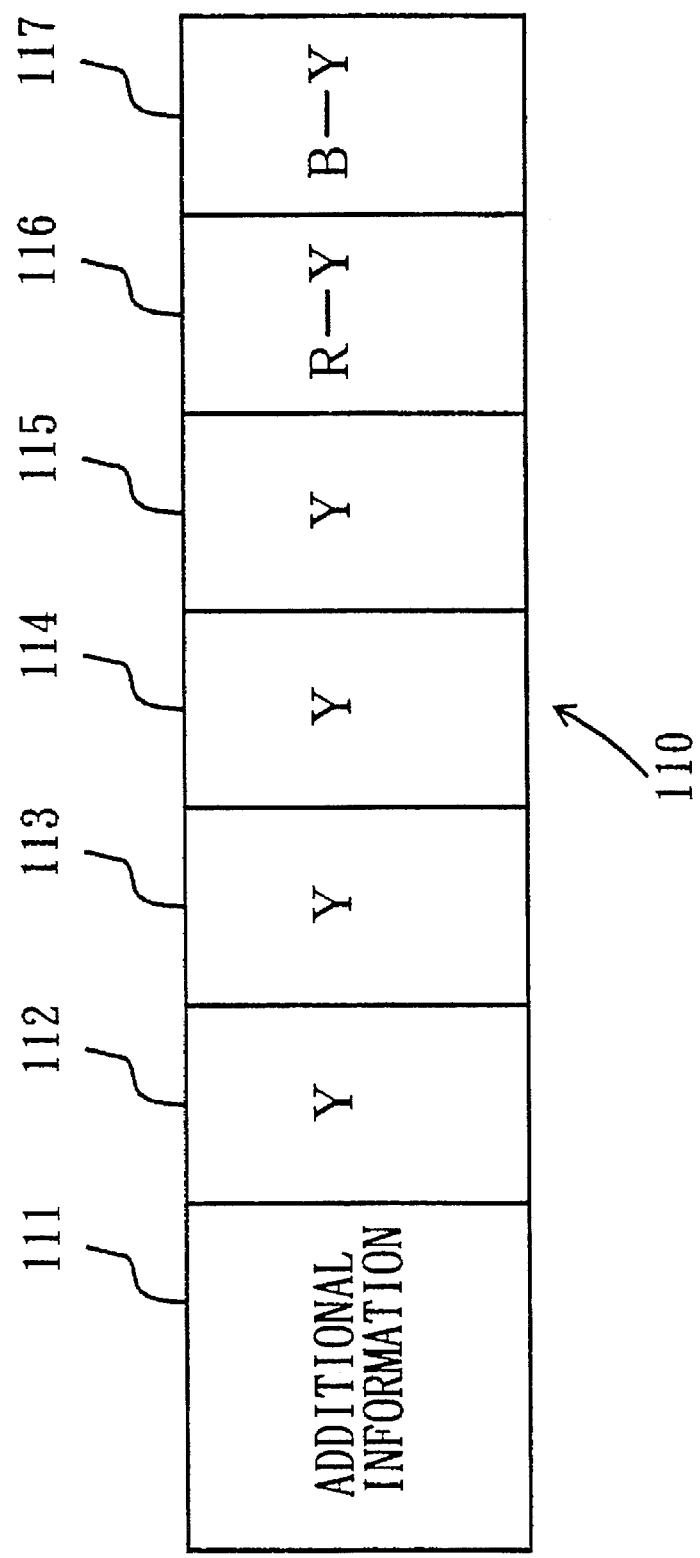
FIG.11 is a diagram representing a data structure of synchronizing block data in the digital recording and reproducing apparatus of the present invention.

The configuration of a synchronizing block data (hereinafter is referred to as SYNC block data) is shown in FIG.11. Referring to FIG.11, the SYNC block data 110 comprises additional information data 111, luminance signal data 112–115 and color difference signal data 116, 117. The additional information data 111 represents a condition in data compression. The data length of each data is predetermined, and a memory area corresponding to each data length is prepared in the memory 99 of FIG.10.

The data length of the coded data input from the terminal 95 is detected by the data length detection circuit 96, and the coded data is written in the memory 99 in compliance with the output signal of the write address control circuit 97. In this processing, the coded data of five macro blocks is written in five memory areas for five SYNC block data 110 (FIG.11).

Generation of the five SYNC block data 110 is elucidated hereafter. Referring to FIG.11, the coded data of one DCT block of the luminance signal Y is stored in the memory area of the memory 99 assigned to the luminance signal data 112. In the storing operation, the data of a "low frequency component" of the luminance signal data 112 is given priority. The low frequency component is designated as a "main component". If the memory area is filled with the data of the low frequency component of the luminance signal data 112, the data of other frequency component (high frequency component, for example) is stored in other memory area. In a similar manner, the coded data of three DCT blocks of luminance signal Y are stored in the respective memory areas assigned to the luminance signal data 113–115. Moreover, the coded data of the respective DCT blocks of the color difference signal (R-Y) and the color difference signal (B-Y) are stored in the respective memory area assigned thereto in the memory 99.

In the above-mentioned storing operation, when a memory area of the five memory areas assigned to the data 112–117 in the memory 99 is filled with the coded data and other memory area of five memory areas is not filled with the coded data, the coded data overflowing the memory area is stored in the other memory area having a space to be stored in the same SYNC block data. In a similar manner, the coded data overflowing a memory area is stored in other memory area having a space to be stored in four memory areas assigned to four SYNC block data.

A data compression information is stored in the memory area of the additional information data 111. As mentioned above, the main component of the coded data of one macro block is stored in the memory area of one SYNC block data. Consequently, one SYNC block data 110 stored in the memory area is in one-to-one correspondence with regard to one macro block 62.

The SYNC block data 110 stored in the memory 99 is read out under the control of the read address control circuit 98, and is applied to a SYNC block data arrangement circuit 5A through a terminal 100. In the SYNC block data arrangement circuit 5A, the SYNC block data 110 is arranged in a predetermined order.

The arrangement of the SYNC block data 110 in the SYNC block data arrangement circuit 5A is elucidated hereafter. As shown in FIG.4, the SYNC block data of one frame is arranged in the order of the rectangular blocks 51–60. Subsequently, as shown in FIG.5, the SYNC block data corresponding to the macro blocks B1–B135 are arranged in the order of the macro blocks B1–B135 in each one of the rectangular blocks 51–60 substantially along the length of each rectangular block (that is, along the horizontal direction in FIG.5). FIG.5 shows an example of the arrangement of the SYNC block data in the rectangular block 51. In the arrangement operation, the SYNC block data having an early number, such as B1, B2, B3 . . . , are arranged at the left end part of the rectangular block and the SYNC block data having a later number, such as B133, B134 and B135, are arranged at the right end part of the rectangular block 51. In the example of arrangement shown in FIG.5, the first SYNC block data having number B1 is placed at left upper part. Five SYNC block data having successive numbers B2–B6 are arranged in the vertical direction. At the bottom of the rectangular block 51, the subsequent SYNC block data having number B7 is placed at a position moved from the position of B6 rightwards by one SYNC block data in the horizontal direction, and five SYNC block data having successive numbers B8–B12 are arranged in the vertical direction. In a similar manner, entire SYNC block data having numbers B13–B135 are arranged in the rectangular block.

Figure 12:
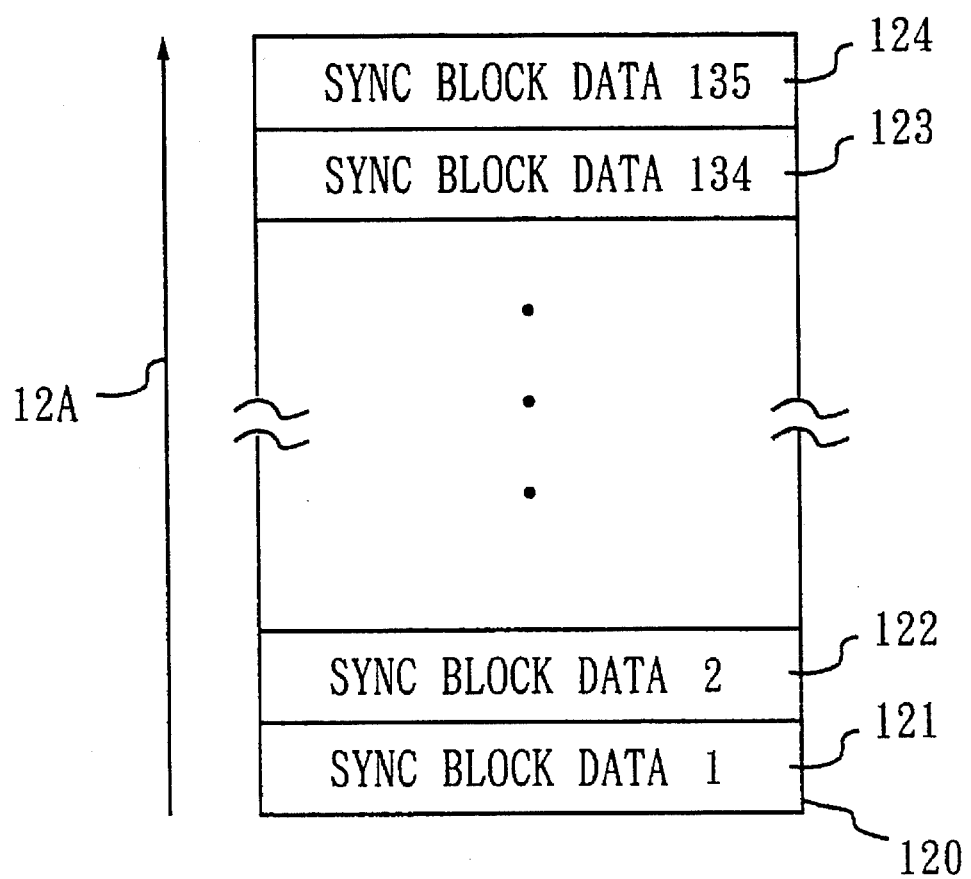
FIG.12 is a diagram representing the data arrangement on a video track of a video tape in the digital recording and reproducing apparatus in accordance with the present invention.
Figure 13:
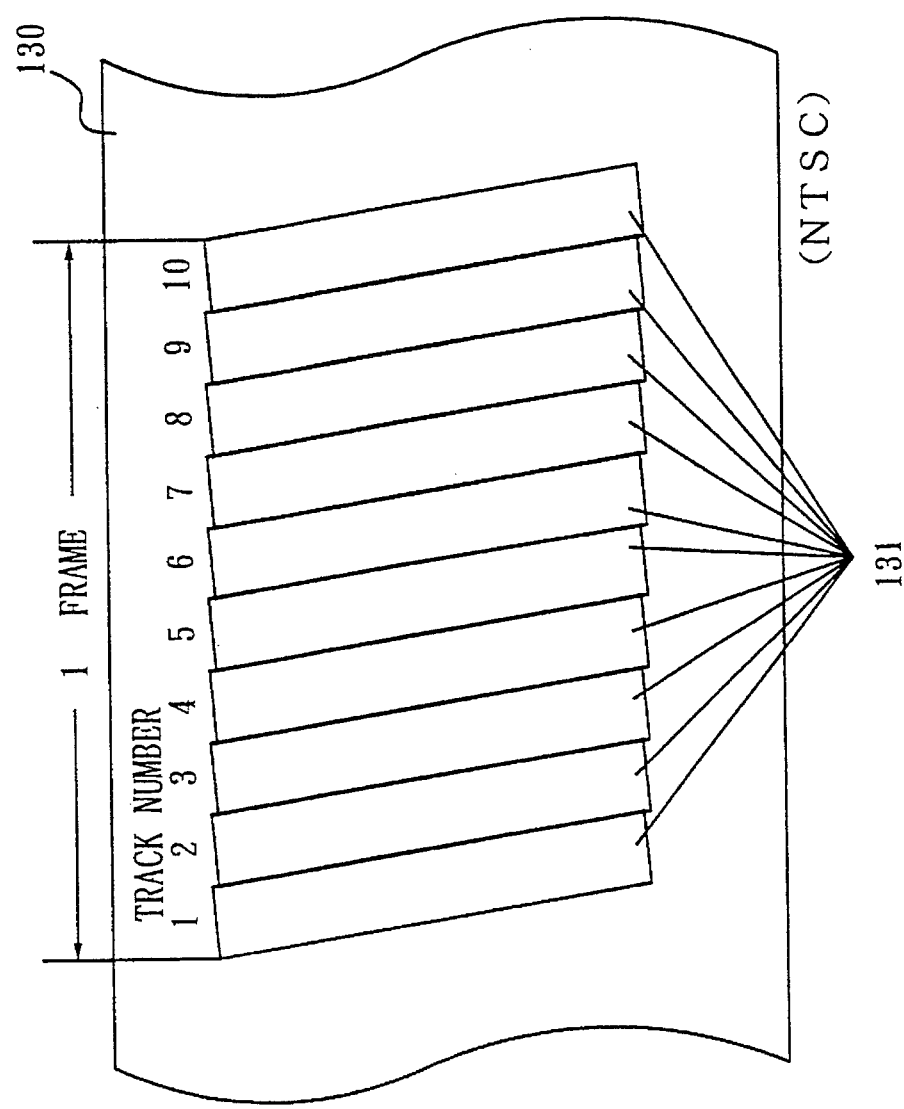
FIG.13 is a plan view of the a magnetic tape representing video tracks of one frame in the NTSC standard in the first embodiment of the digital recording and reproducing apparatus.

The SYNC block data arranged as shown in FIG.5 are applied to an error correction coding circuit 6 of FIG.1. In the error correction coding circuit 6, a predetermined error correction code is added to the SYNC block data, and is applied to a SYNC.ID addition circuit 7, and a SYNC pattern and an ID data including a track number and a SYNC block number are added to the SYNC block data. Subsequently, the SYNC block data of the rectangular blocks 51–60 are recorded in the video areas of the respective tracks 131 of the magnetic tape 130 as shown in FIG.13. In FIG.13, the SYNC block data of the track number 1 corresponds to the macro blocks of the rectangular block 51. In a similar manner, the SYNC block data of the track numbers 2–10 correspond to the macro blocks of the rectangular blocks 52–60, respectively. In FIG.12, the SYNC block data 1 corresponds to the macro block B1. In the similar manner, the SYNC block data 2–135 correspond to the macro blocks B2–B135, respectively.

The SYNC block data is modulated in a modulation circuit 8, and is recorded In the magnetic tape 11 through a recording amplifier 9 and the recording head 10.

As shown in FIG.12, the SYNC block data 1–135 are recorded in one track 120 of the magnetic tape in the order of the numbers 1–135 (hereinafter referred to as SYNC block numbers 1–135, respectively) of the SYNC block data in a scanning direction of the recording head 10 shown by an arrow 12A.

FIG.13 is a plan view of the magnetic tape illustrating the tracks in which the above-mentioned SYNC block data are recorded. As shown in FIG.13, the SYNC block data of the image signal of one frame is recorded in the video areas of ten tracks 131 on the magnetic tape 130. As shown in FIG.12, the SYNC block data 1–135 are recorded in the order of the number of the SYNC block data along the length direction of the track 120, and thus the main component of the coded data of the macro block B1 in the rectangular block 51 is recorded in the video area 121 of the track 120 having track number 1. In a similar manner, the main component of the coded data of the macro block B135 of the rectangular block 51 is recorded in the video area 124 of the track 120 having track number 1. Moreover, the main component of the coded data of the macro block B1 of the rectangular block 60 is recorded in the area 121 of the track 120 having track number 10. In a similar manner, the main component of the coded data of the macro block B135 of the rectangular block 60 is recorded in the video area 124 of the track 120 having track number 10.

[Normal speed reproducing operation]

The reproducing operation of the data recorded as mentioned above is elucidated hereafter. In the normal speed reproduction (reproduction by the same tape speed as the speed in the recording operation), the reproduced data detected by the reproducing head 12 is input to a demodulation circuit 14 through a reproduction amplifier 13, and is demodulated thereby. Subsequently, each SYNC pattern of the SYNC block data is detected by a SYNC.ID detection circuit 15, whereby the SYNC block ID is detected to identify each of the SYNC block data. These SYNC block data are applied to an error correction circuit 16, and a predetermined error correction operation is applied thereto and are input to an output image generation circuit 17. Consequently, the SYNC block data are output from the output image generation circuit 17 in the order of recording operation and is applied to a decoding circuit 18.

In the decoding circuit 18, a predetermined decoding operation is applied to the SYNC block data, and the block data are decoded in units of five SYNC block data. The block data is deblocked by a deblocking circuit 19. The video image data output from the deblocking circuit 19 is converted to an analog video signal by a digital to analog converter 20 (hereinafter is referred to as DAC) and is output to an output terminal 21 for a video image signal.

[High speed reproducing operation]

The high speed reproducing operation (reproducing operation at a higher tape running speed than that of the recording operation) is elucidated below.

Referring to FIG.1 at least one "reference speed" representing a tape running speed in the high speed reproducing operation is stored in a reference speed memory circuit 24. The "reference speed" is represented by a ratio of the tape running speed in the high speed reproducing operation to the tape running speed in the recording operation.

Figure 15:
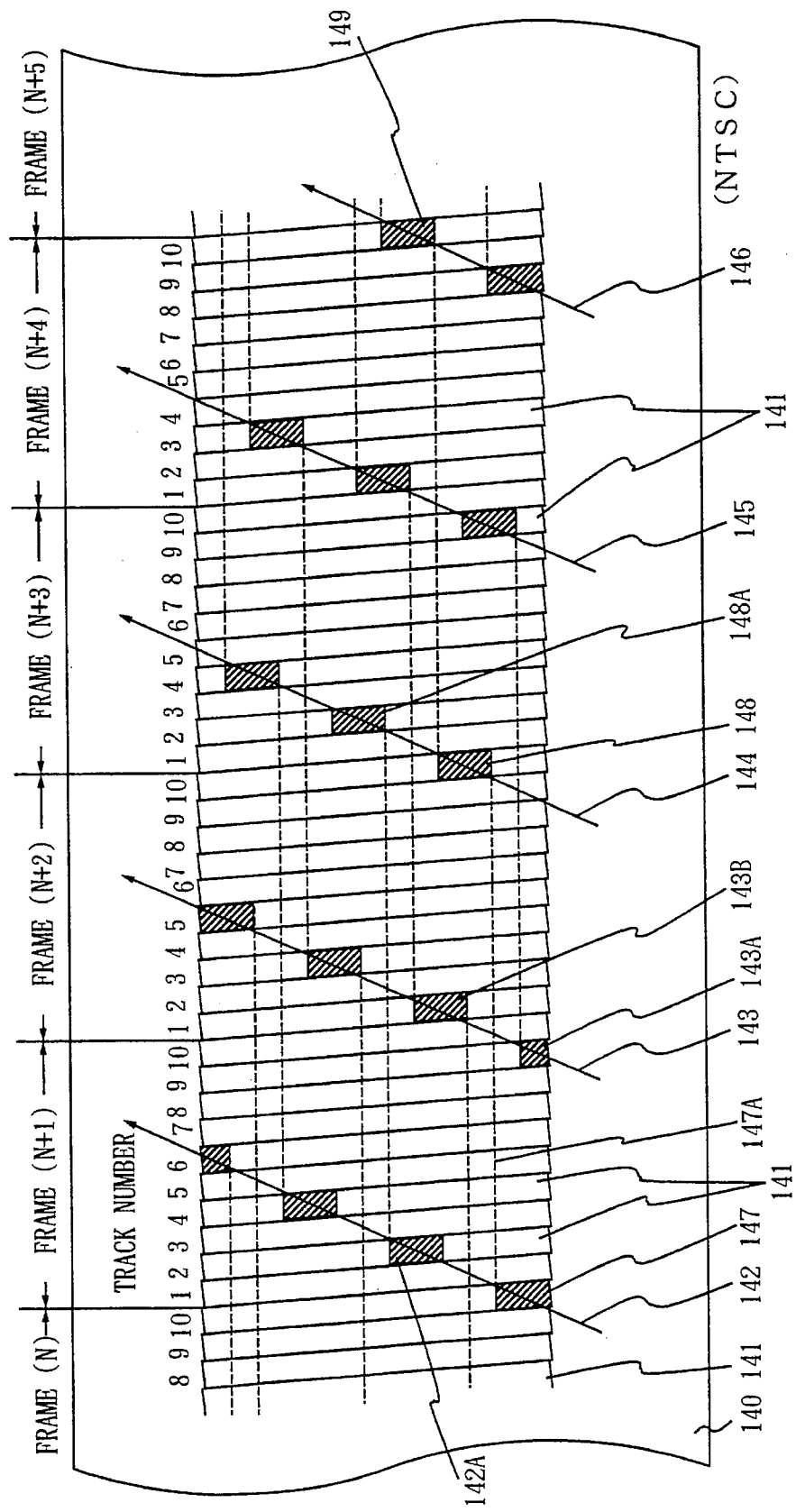
FIG.15 is a plan view of a magnetic tape representing regions of the video tracks which is reproduced by reproducing head elements in high speed reproduction operation in the first embodiment.

FIG.15 is a plan view of the magnetic tape 140 representing video regions on the tracks 141 which are reproduced by two reproducing head elements in the high speed reproduction. Hatched parts illustrated on the tracks 141 represent video areas of the tracks 141 which are traced by the reproducing head elements, and the data of the hatched parts are detected by the respective reproducing head elements. When the magnetic tape runs in the reference speed, regions 147, 148 and 149 of the tracks having the same track number 10 are scanned by one reproducing head element. The regions 147, 148 and 149 are shifted in plural successive frames (N), (N+1), (N+2), (N+3) and (N+4) in a direction (substantial scanning direction of the recording head element or the inverse direction) in the order of the frame number of the plural successive frames (N), (N+1), (N+2), (N+3), (N+4) as shown in FIG.15. Namely, when the tape running speed is set to the reference speed, the regions 147, 148, 149 which are scanned by the reproducing head element, is shifted upward on the tracks having the same track number of the successive frames. Examples of the reference speed are ±3.1, ±3.3, ±9.5, ±10.5, ±19.5 and ±20.5. The positive sign represents the same tape running direction in the reproducing operation as the tape running direction in the recording operation and the negative sign represents the reverse tape running direction thereof. In the embodiment of the present invention, the operation is elucidated in the reference speed having the positive sign, however, the operation is applicable to the reference speed having the negative sign in a similar manner. In general, a reference speed in a two-head helical scanning system at 9000 rpm of rotating speed is represented by $$\pm[(t\pm0.5)/(2N-1)], \text{ and } \pm[S\times t\pm0.5],$$

where, N and S are natural numbers, and t is the number of tracks in which the data of one frame is recorded. A little tolerance is permissible in the reference speeds.

The data of the plural reference speeds are stored in the reference speed memory circuit 24 in advance. In the embodiment, the data of ±9.5 of the reference speed is stored in the reference speed memory circuit 24, for example. The data of the reference speed +9.5 is read out from the reference speed memory circuit 24, and is applied to a speed control circuit 25 of FIG.1. The tape running speed is detected by a speed sensor 23 which detects a revolution speed of a capstan 22. The detected speed data of the tape running speed is applied to the speed control circuit 25. In the speed control circuit 25, an error between the tape running speed and the reference speed +9.5 is detected. A control signal for controlling the rotating speed of the capstan 22 is generated on the basis of the error and is applied to a driving circuit 26. The capstan 22 is driven by the output of the driving circuit 26. Consequently, the running speed of the magnetic tape 11 is controlled to the reference speed +9.5.

In FIG.15, head paths of the reproducing head elements of the rotating head are represented by arrows on the magnetic tape 140. When the head element passes on the magnetic tape 140 by one scanning, the magnetic head element traverses plural tracks 141. Consequently, plural data are reproduced from the plural tracks 141. Head paths 142, 144 and 146 are formed by one of two head elements. On the other hand, the paths 143 and 145 are formed by the other head element of two head elements.

The region 147 on the head path 142 includes a part of the SYNC block data of track number 10 of frame (N). In a similar manner, the region 148 on the head path 144 includes a part of the SYNC block data in the track number 10 of frame (N+2) which is dislocated from the region 147. In actual reproducing operation, the upper end of the region 147 protrudes upward from a dotted line 147A and the lower end of the region 148 protrudes downward from the dotted line 147A in FIG.15. The protruding areas are changed by a positional relation between the magnetic tape 140 and the reproduced head elements. The reproduced data is applied to the output image generation circuit 17 through the demodulation circuit 14, SYNC.ID detection circuit 15 and error correction circuit 16 in a manner similar to the operation in the normal speed reproducing operation mentioned above.

Figure 16:
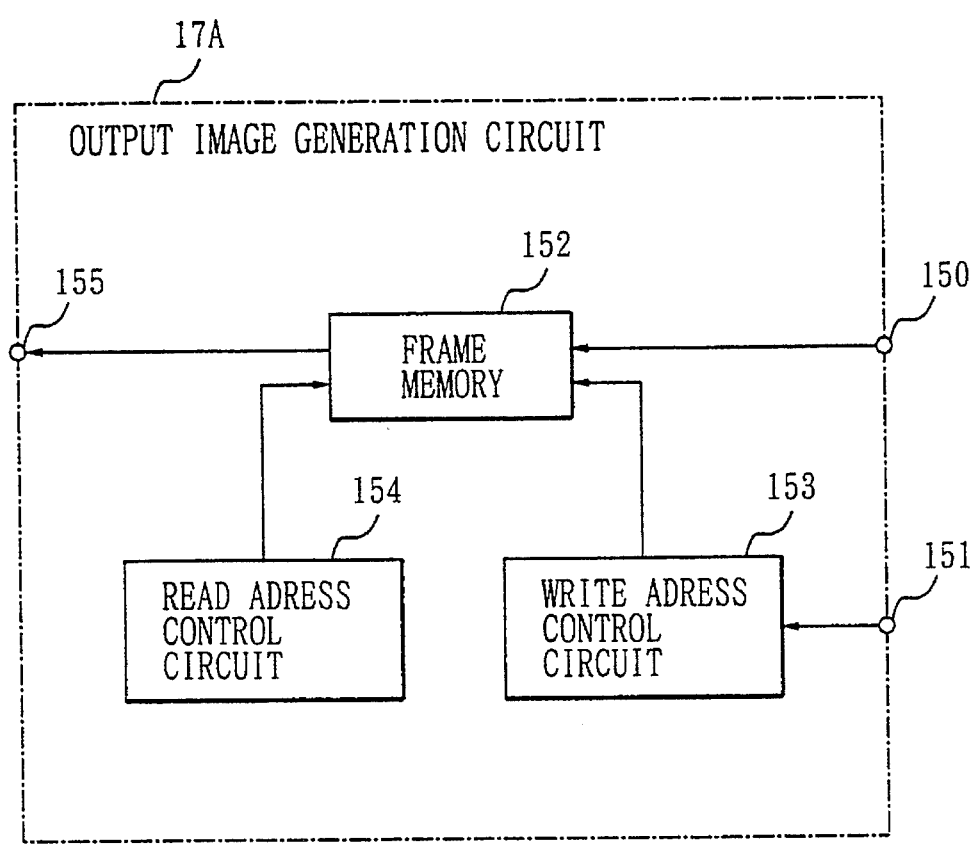
FIG.16 is a block diagram of an output image generation circuit of the first embodiment.

A first embodiment of the output image generation circuit 17 is shown in FIG.16. An output image generation circuit 17A comprises a frame memory 152, a write address control circuit 153 and a read address control circuit 154. A SYNC block data and a SYNC block ID output from the error correction circuit 16 are applied to the output image generation circuit 17A. The SYNC block data is input to the frame memory 152 through a terminal 150. On the other hand the SYNC block ID is input to the write address control circuit 153 through a terminal 151. In the write address control circuit 153, an address of a memory area in the frame memory 153 for storing the SYNC block data is generated on the basis of the SYNC block ID having a track number of the magnetic tape in which the synchronizing block data is recorded, and a synchronizing block number for identifying a position of the synchronizing block data in the track. Consequently, the SYNC block data is stored in the memory area of the address. The SYNC block data input from the terminal 150 are written over the previous data in the frame memory 152 in the input order.

Arrangement of the data stored in the frame memory 152 is shown in FIG.17. Referring to FIG.17, the data of the regions shown by the hatched parts in FIG.15 are written in the memory areas of the frame memory 152 in the order of the respective frame numbers. In the frame memory 152 shown in FIG.17, the memory area 156 of the frame memory 152 corresponds to the output video image. Reproduced data 157 represent areas of the macro blocks in the frame memory 152 corresponding to the SYNC block data in the video area of the hatched parts of FIG.15.

When the SYNC block data is written in the frame memory 152, simultaneously, the previous SYNC block data which have been written early are read out from the frame memory 152 by the control signal of the read address control circuit 154. The read-out data is applied to the decoding circuit 18 through a terminal 155. The control signal of the read address control circuit 154 is output in synchronism with the timing of each frame.

In the decoding circuit 18, the data of one macro block is decoded from one SYNC block data. In detail, the block data of the macro block is decoded from the main component of the coded data included in the SYNC block data.

The decoded block data is deblocked by a deblocking circuit 19 and is converted to an analog signal by the DAC 20, and is output to the terminal 21 for an analog video signal.

In the output video image 156, as shown in FIG.17, the reproduced data are arranged in the reproduced order from the magnetic tape 11. Neighboring two reproduced data in the horizontal direction in FIG.17 are the data reproduced on every other frame. Namely, there is a time interval corresponding to two frames between two reproduced data in the almost areas of the output image. Moreover, in the vertical direction in FIG.17, the reproduced data are arranged from one end to the other end of the video image in the order reproduced from the magnetic tape. Namely, in the vertical direction and the horizontal direction in the output video image, neighboring two reproduced data are formed by relatively near frames, and thereby an image quality in the high speed reproduction is improved. In the first embodiment of the output image generation circuit 17 of FIG.1, since only one frame memory 152 is used, dislocation of the video image is liable to generated in the output video image. The dislocation of the video image is generated from the right upper part to the left lower part of the video image, for example. The dislocation greatly deteriorates the image quality of the output image. In order to prevent the generation of the dislocation of the video image, an output image generation circuit 17B is used in a second embodiment shown in FIG.18.

[Second embodiment]

Figure 18:
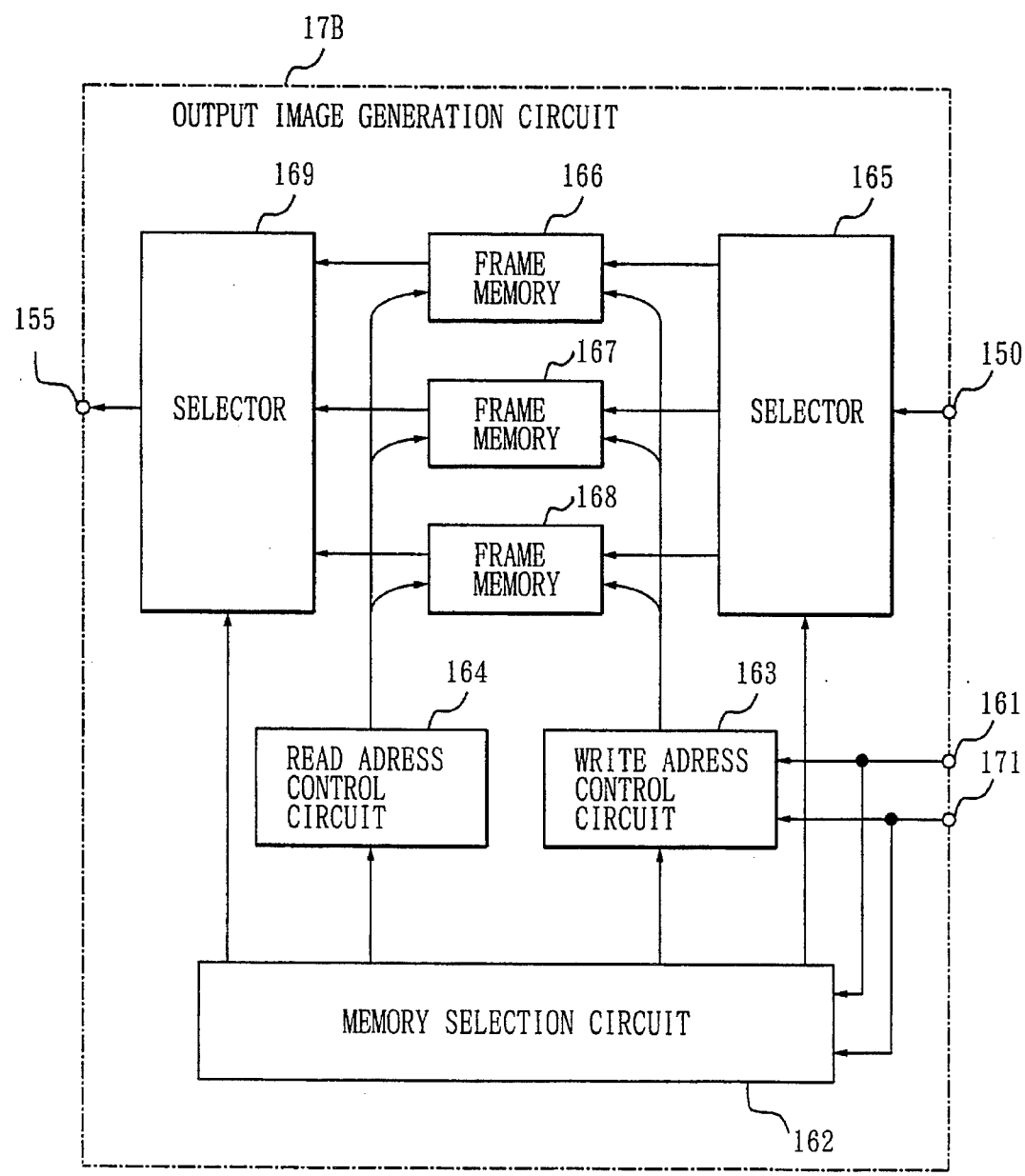
FIG.18 is a block diagram of an output image generation circuit of a second embodiment of the digital recording and reproducing apparatus in accordance with the present invention.

The output image generation circuit 17B of FIG.18 comprises three frame memories 166, 167 and 168, two selectors 165 and 169 for switching the frame memories 166–168, a memory selection circuit 162 for selecting the frame memory, a write address control circuit 163 and a read address control circuit 164. The SYNC block data is input to the selector 165 through a terminal 150. The SYNC block ID is input to the write address control circuit 163 and the memory selection circuit 162 through a terminal 161. Moreover, a speed information signal representing the tape running speed is input to the write address control circuit 163 and the memory selection circuit 162 through a terminal 171.

The speed information signal has data to detect a "stable state" or "astable state" of the tape running speed, and is generated in the speed control circuit 25. When the difference between the running speed of the magnetic tape and a reference speed is larger than a predetermined value, the speed information signal becomes a signal representing the astable state. On the other hand, when the difference between the running of the magnetic tape and the reference speed is smaller than the predetermined value, the speed information signal becomes a signal representing the stable state.

When the running speed of the magnetic tape is switched from the normal speed to the high speed of the reference speed +9.5, the running speed of the magnetic tape is accelerated from the reference speed +1.0 to the reference speed +9.5. In the acceleration period (hereinafter referred to as transition period), because the difference between the running speed of the magnetic tape and the reference speed is larger than the predetermined value, the speed information signal representing the unstable state is output from the speed control circuit 25, and is applied to the terminal 171 of the output image generation circuit 17B.

When the running speed of the magnetic tape reaches the reference speed +9.5, the speed information signal representing the stable state is output from the speed control circuit 25.

In the stable state, the output image generation circuit 17B is operated in compliance with flow charts shown in FIG.19(*a*) and FIG.19(*b*). FIG.19(*a*) is the flow chart of write memory selection operation, and FIG.19(*b*) is the flow chart of read memory selection operation.

The write memory selection operation is elucidated hereafter. First, at step 181, when the reproducing head elements scan the magnetic tape, the memory selection circuit 162 sets a frame memory to operation for writing the SYNC block data by identifying SYNC block ID. In FIG.15, when the reproducing head element traces the path 142, the regions 147 and 142A shown by hatched parts are detected from the respective tracks of both the frame N and the frame (N+1). The SYNC block data reproduced from the frame N is written in the frame memory 167, and the SYNC block data reproduced from the frame (N+1) is written in the frame memory 166. In a similar manner, one of the frame memories 166–168 is set to write every SYNC block data.

Figure 19A:
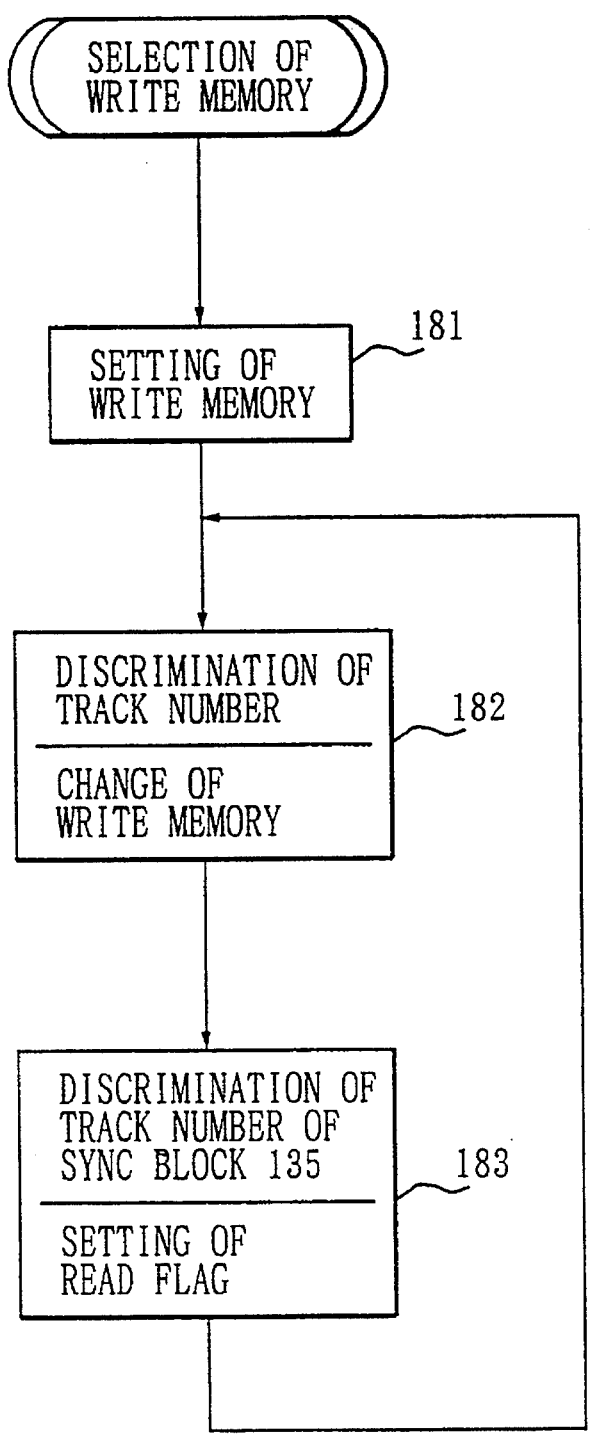
FIG.19(a) is a flowchart of a write memory selection operation in the output image generation circuit of the second embodiment of the digital recording and reproducing apparatus in accordance with the present invention.

The detailed operation of the memory selection circuit 162 is elucidated hereafter. In FIG.15, the track number "10"

of the SYNC block data of the region 147 is identified by the memory selection circuit 162, and the frame memory 167 is set to write. When the successive region 142A is reproduced on the head path 142, the track number "2" of the SYNC block data is identified, and the frame memory 166 is set to write. As mentioned above, the track number is identified every reproduced SYNC block data, and one of the frame memories 166–168 is set to write on the basis of the track number. In the above-mentioned operation, the frame memory to be written is set in the order of the frame memory 167 and the frame memory 166. After this, operations shown at steps 182 and 183 of the flow chart in FIG.19(a) are performed for scanning of the tracks of the magnetic tape by the reproducing head elements.

Subsequently, "write memory switching operation" is elucidated hereafter. In FIG.15, when the reproducing head element traces a path 143, the regions 143A and 143B shown by hatched parts are detected from the respective tracks of both the frame (N+1) and the frame (N+2). In the memory selection circuit 162, it is identified that the track number of the SYNC block data in the firstly reproduced region 143A is "9". Because the track number "9" is close to the track number "10" having the firstly reproduced SYNC block data in the previous scanning, frame memory 167 is set to write.

When the track number of reproduced SYNC block data is changed from "9" to "1" by scanning the region 143B, the frame memory for writing the SYNC block data is changed. Consequently, the SYNC block data reproduced from the frame (N+1) is written in the frame memory 167, and the SYNC block data reproduced from the frame (N+2) is written in the frame memory 166.

In the path 144, the regions 148 and 148A shown by hatched parts are located on the respective tracks of both the frame (N+2) and the frame (N+3). In the memory selection circuit 162, the track number "10" of the SYNC block data of the first region 148 is identified. Since the track number "10" is close to the track number "9" having the SYNC block data of the first region 143A in the previous scanning, the frame memory 167 is set to write.

When the track number of the reproduced SYNC block data changes from "10" to "2" by scanning the region 148A, the frame memory for writing the SYNC block data is changed. Consequently, the SYNC block data reproduced from the frame (N+2) is written in the frame memory 167, and the SYNC block data reproduced from the frame (N+3) is written in the frame memory 166. As mentioned above, the change of the write memory is performed for every scanning of the regions.

The operation of "read flag set" at step 183 of FIG.19(a) is elucidated hereafter. When reproduction of the SYNC block data having SYNC block number "135" and the track numbers "1" and "2" is identified by the memory selection circuit 162, a read flag of the frame memory 166 is set. After this operation, the write operation of the data in the frame memory 166 is inhibited.

"The memory selection operation" is elucidated hereafter.

Figure 19B:
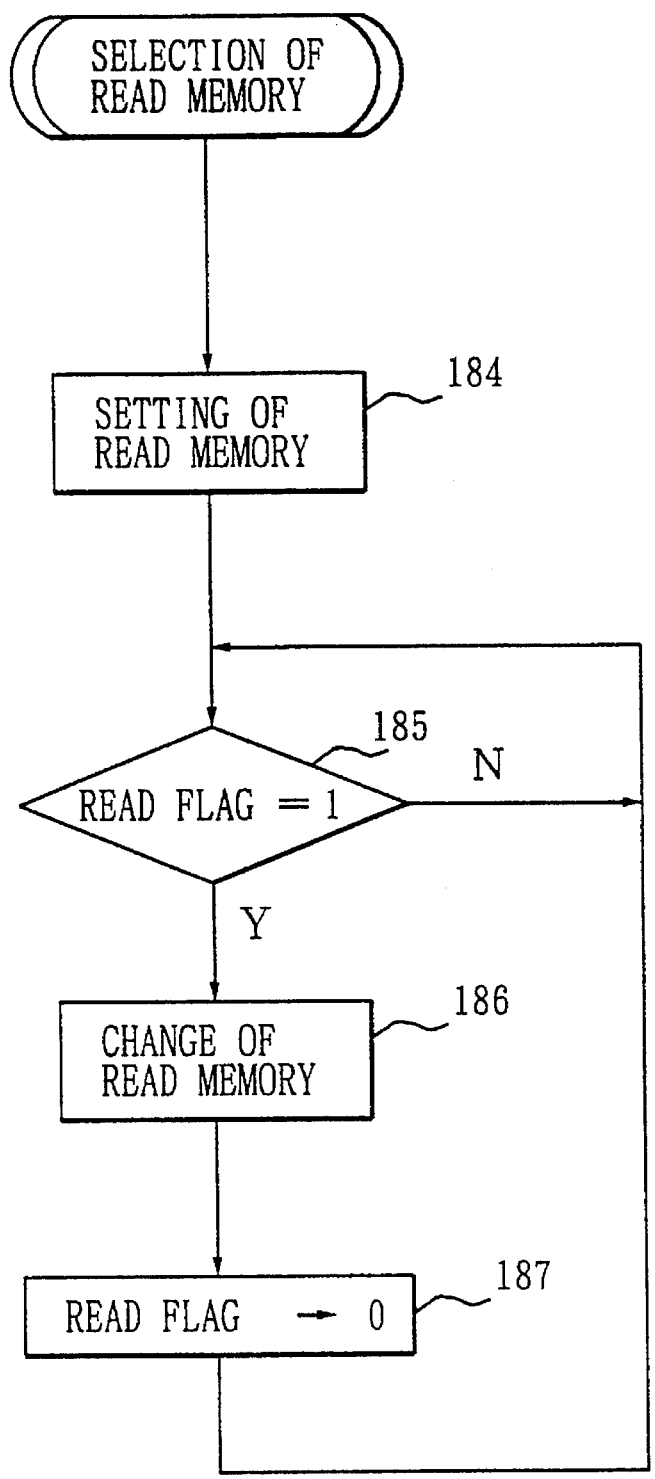
FIG.19(b) is a flowchart of a read memory selection operation of the output image generation circuit of the second embodiment of the digital recording and reproducing apparatus in accordance with the present invention.

In the read memory setting operation at step 184 in FIG.19(b), initial setting of the read memory is performed. Consequently, a frame memory which is in the read operation in the speed transition period is set to the read memory. Namely, in the memory selection circuit 162, the frame memory 168 is selected for the read memory.

At steps 185, 186 and 187 in FIG.19(b), it is detected by the memory selection circuit 162 in the period of the output of the reproduced video image that the read flag is set or not. When the setting of the read flag of tile frame memory 166 is detected, the operation of the read memory is changed from the frame memory 168 to the frame memory 166, and the read flag is reset.

The data of the selected read memory is applied to the selector 169 and the read address control circuit 164. A control signal which is in synchronism with the timing of every frame of the output signal is output from the read address control circuit 164. The SYNC block data is read out from the frame memory by the control signal, and is applied to the decoding circuit 18 through the selector 169 and a terminal 155.

Figure 20:
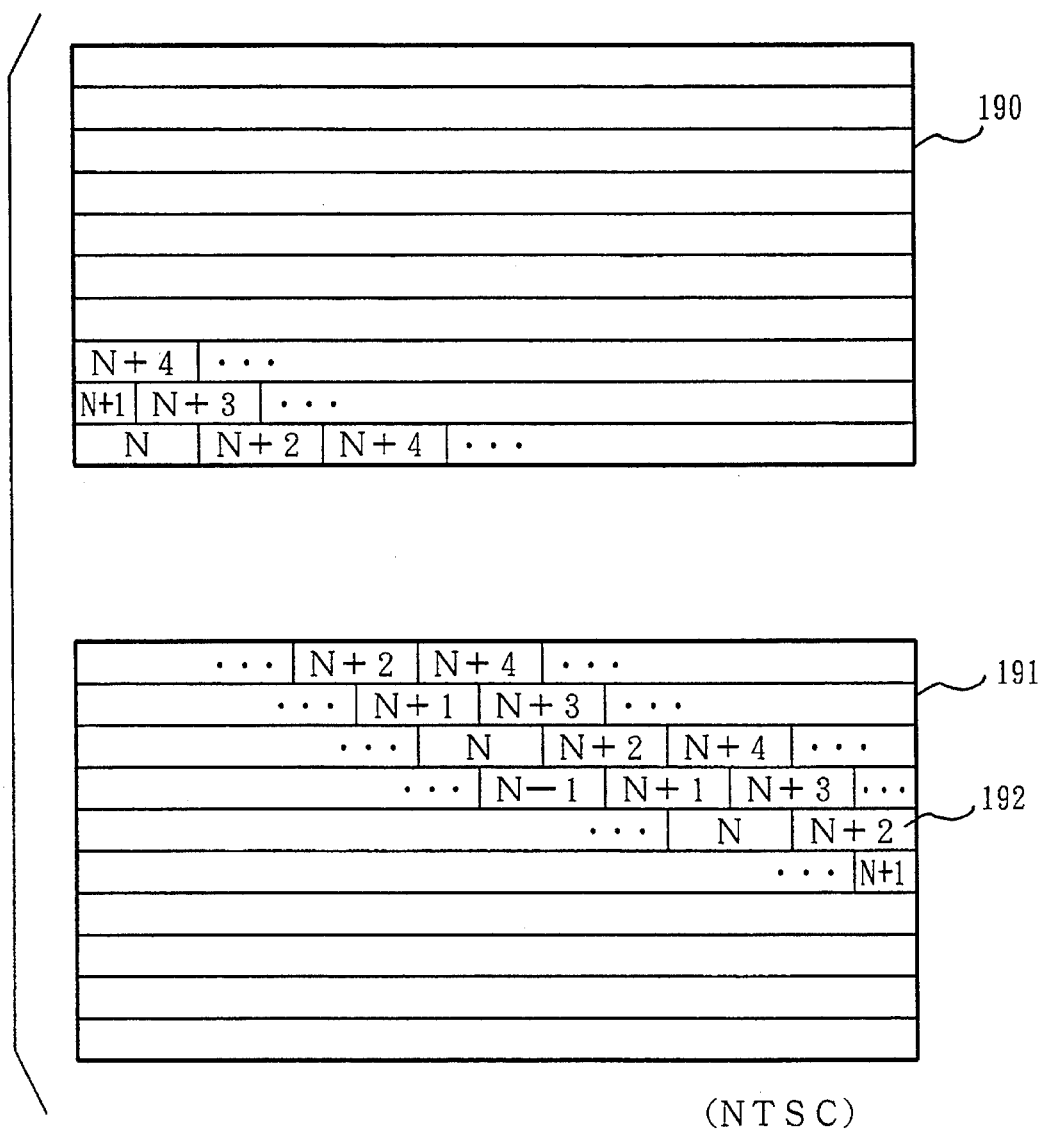
FIG.20 is a diagram representing the data arrangement in the frame memory in the output image generation circuit of the second embodiment of the digital recording and reproducing apparatus in accordance with the present invention.
Figure 21:
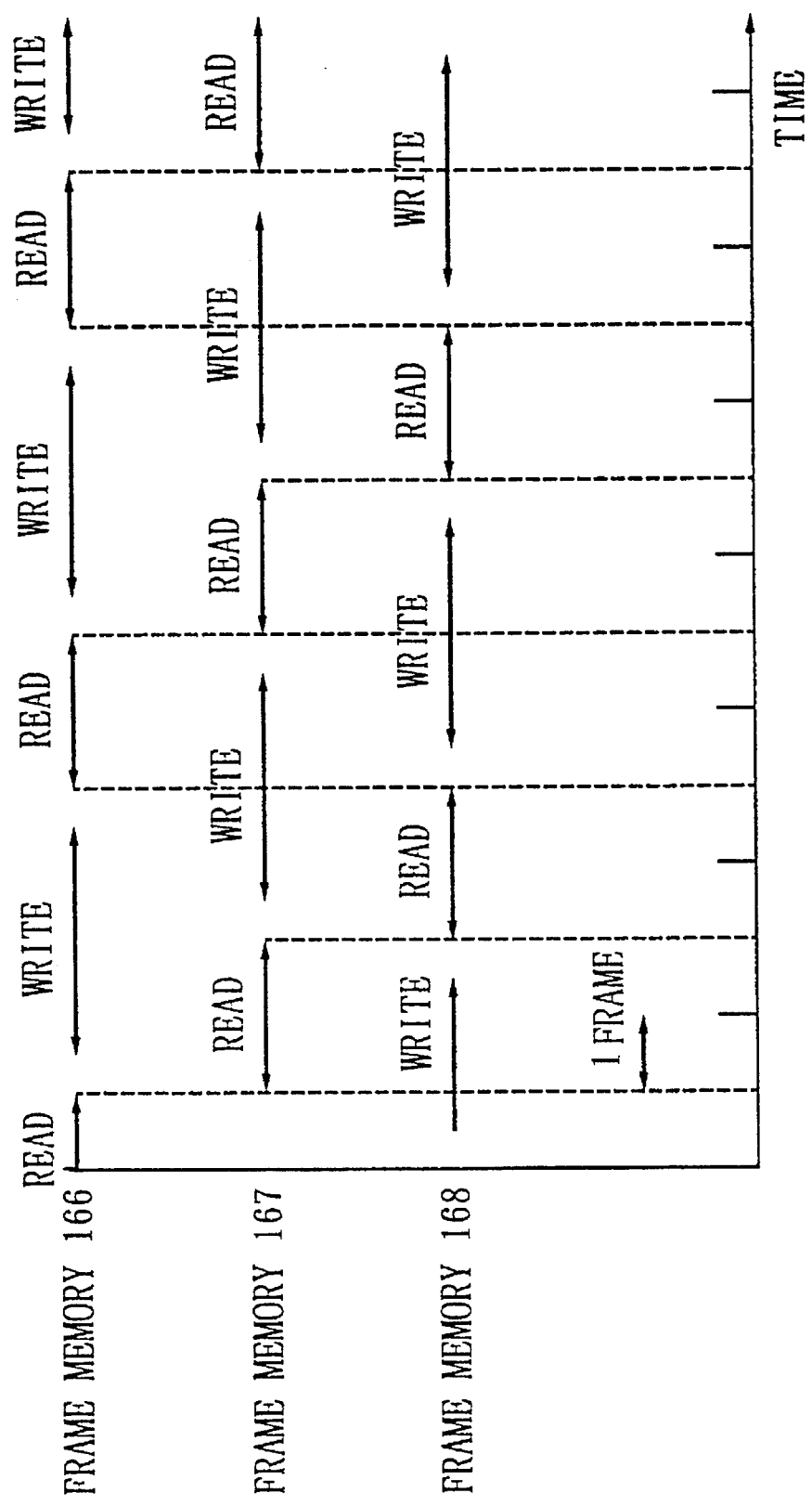
FIG.21 is a timing chart illustrating the timing of write and read operations in the frame memories of the output image generation circuit of the second embodiment.

FIG.20 is a diagram representing the state in the frame memories 167 and 166 in which the reproduced data by the head paths 142–146 in FIG.15 are written. Referring to FIG.20, the reproduced data 192 are written in the respective frame areas 190 and 191 of the frame memories 167 and 166. FIG.21 is a timing chart representing the operation of the frame memories 166–168. Change of the write operation and read operation of the frame memories 166–168 is represented by the timing chart.

In FIG.20, the reproduced data are written in the frame memory in a manner such that the reproduced data are arranged on the video display in the order of frame number on the magnetic tape, and after the data from an end (the SYNC block data of the track number "10" and the SYNC block number "1") to the other end of the video image (the SYNC block data of the track number "1" and the SYNC block number "135") are written in the frame memory, the frame memory is changed to read operation. Namely, in the output video image, the reproduced data is arranged with a time interval corresponding to two frames from one end to the other end of the video image in the horizontal direction. Moreover, in the vertical direction, the reproduced data is also arranged from one end to the other end of the video image in the order reproduced from the magnetic tape.

Consequently, the output video image is formed by the data having a relatively reduced time shift between the neighboring two data from one end to the other end of the video image in the horizontal direction and the vertical direction. Consequently, the image quality in the high speed reproduction is greatly improved.

[Third embodiment (PAL standard)]

Application of the apparatus for recording and reproducing the digital video signal to the PAL standard is elucidated hereafter.

An analog composite signal in the PAL standard is converted into an analog component signal by the known decoder (not shown), and is input to an input terminal 1 of the circuit shown in FIG.1. The component signal is converted to a digital signal of 4:2:2 format by the ADC 2.

The digital signal is applied to the blocking circuit 3. In the blocking circuit 3, the decimation operation is applied to the color difference signals (R-Y) and (B-Y) in the decimation circuit 31, and the video data of 4:2:2 format is converted to 4:2:0 format as shown in FIG.6.

The image data of 4:2:0 format is written in the memory 32 of the blocking circuit 3 by control operation of the write address control circuit 33. Subsequently, the image data is read out from the memory 32 by control operation of the read address control circuit 34, and block data is output to the terminal 35. The block data is applied to the coding circuit 4.

Figure 6:
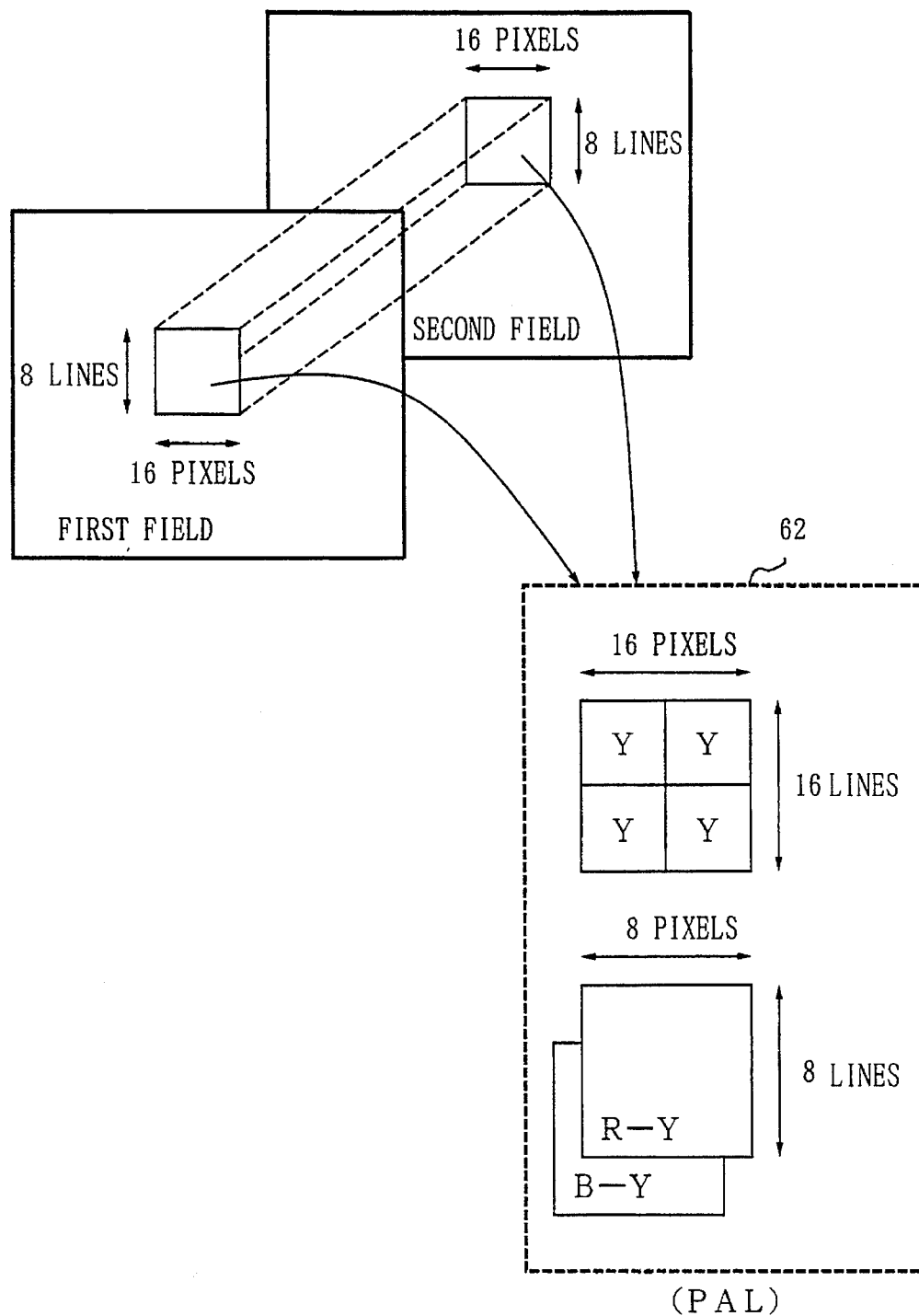
FIG.6 is a diagram representing a macro block in the PAL standard which is used in the digital recording and reproducing apparatus of the present invention.

The structure of the block data is shown in FIG.6. In the block data, the video image of one frame is divided into a plurality of macro block in a manner similar to the NTSC standard. Referring to FIG.6, one macro block 62 comprises four DCT blocks of the luminance signal Y, one DCT block of the color difference signal (R-Y) and one DCT block of the color difference signal (B-Y). One DCT block comprises horizontal data of 8 pixels and vertical data of 4 lines of each field, and consequently the number of data results in 64 (8×4×2).

Figure 7:
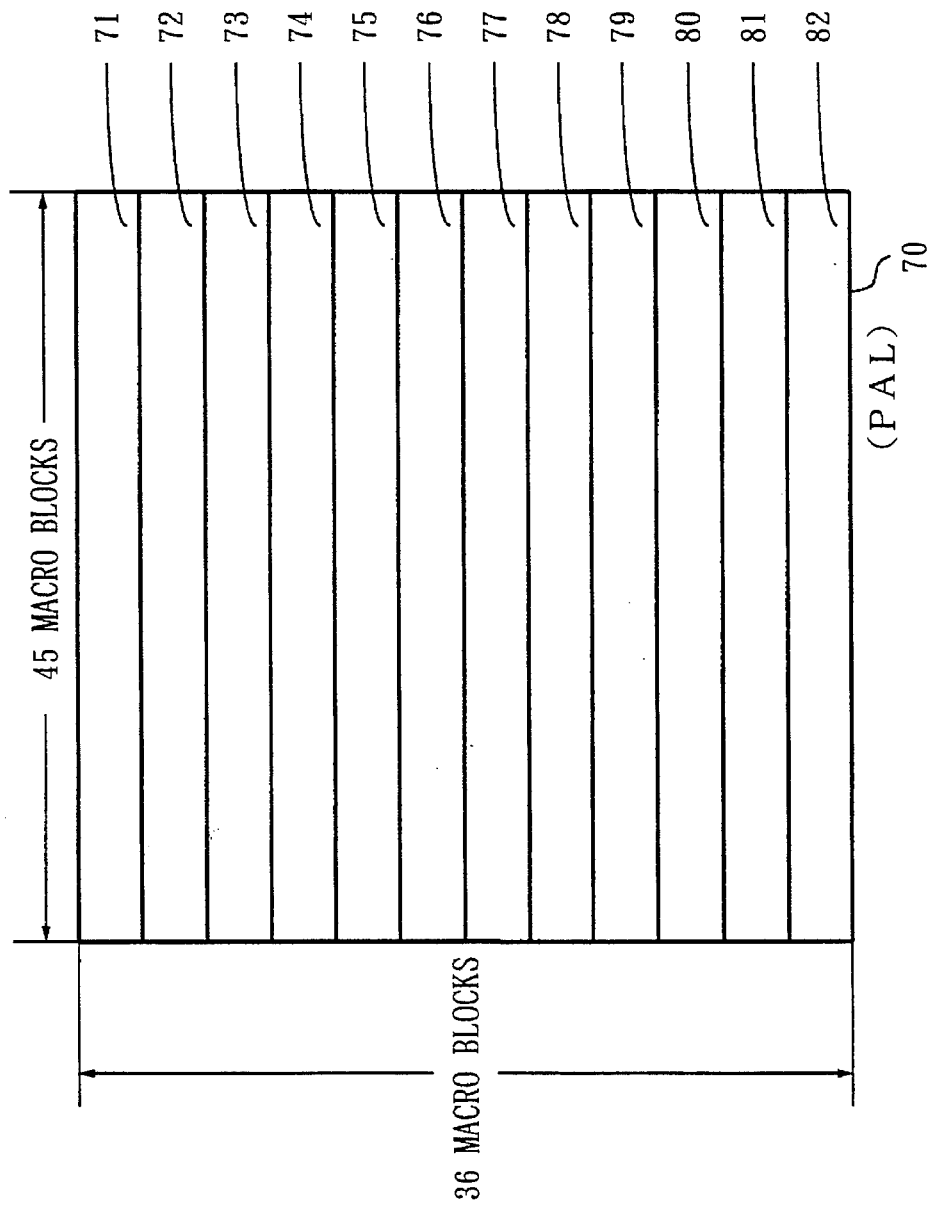
FIG.7 is a diagram representing rectangular blocks in the PAL standard by which a video image is divided into plural rectangular blocks in the third embodiment of the digital recording and reproducing apparatus of the present invention.

In general, in digital processing of the video signal, the data of the luminance signal Y of one frame are represented by the product of the horizontal data of 720 pixels by the vertical data of 576 lines. On the other hand, each data of the color difference signals (R-Y) and (B-Y) of one frame is represented by the product of the horizontal data of 360 pixels by the vertical data of 288 lines. Therefore, as shown in FIG.7, the video image 70 of one frame is divided into 45 macro blocks in the horizontal direction and into 36 macro blocks in the vertical direction. Consequently, the video image 70 of one frame is divided into 1620 (45×36) macro blocks.

Figure 8:
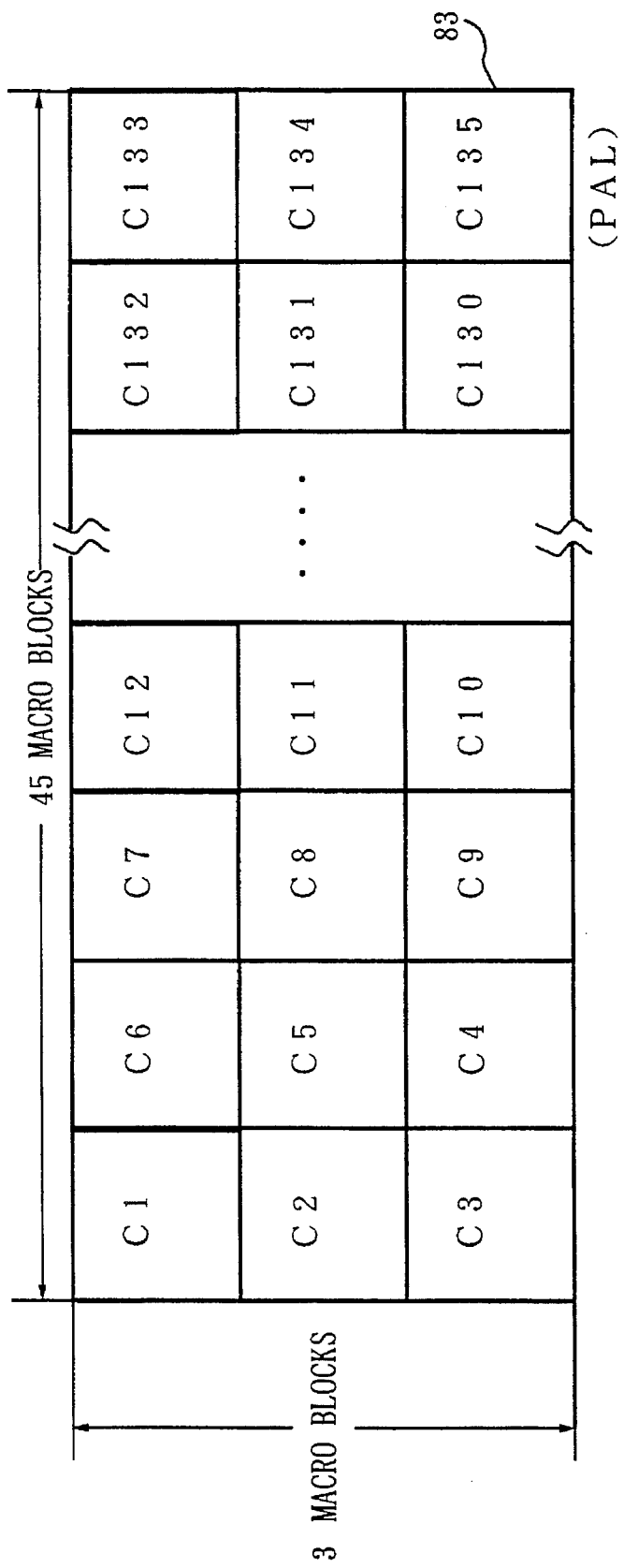
FIG.8 is a diagram representing arrangement of macro blocks in the rectangular block in the PAL standard in the third embodiment.

The video image 70 is divided into twelve rectangular blocks 71– 82. As shown in FIG.8, each rectangular block comprises macro blocks C1–C135.

Data compression operation is applied to every five macro blocks, for example. One macro block of the main component of the coded data of corresponds to one SYNC block data.

Figure 14:
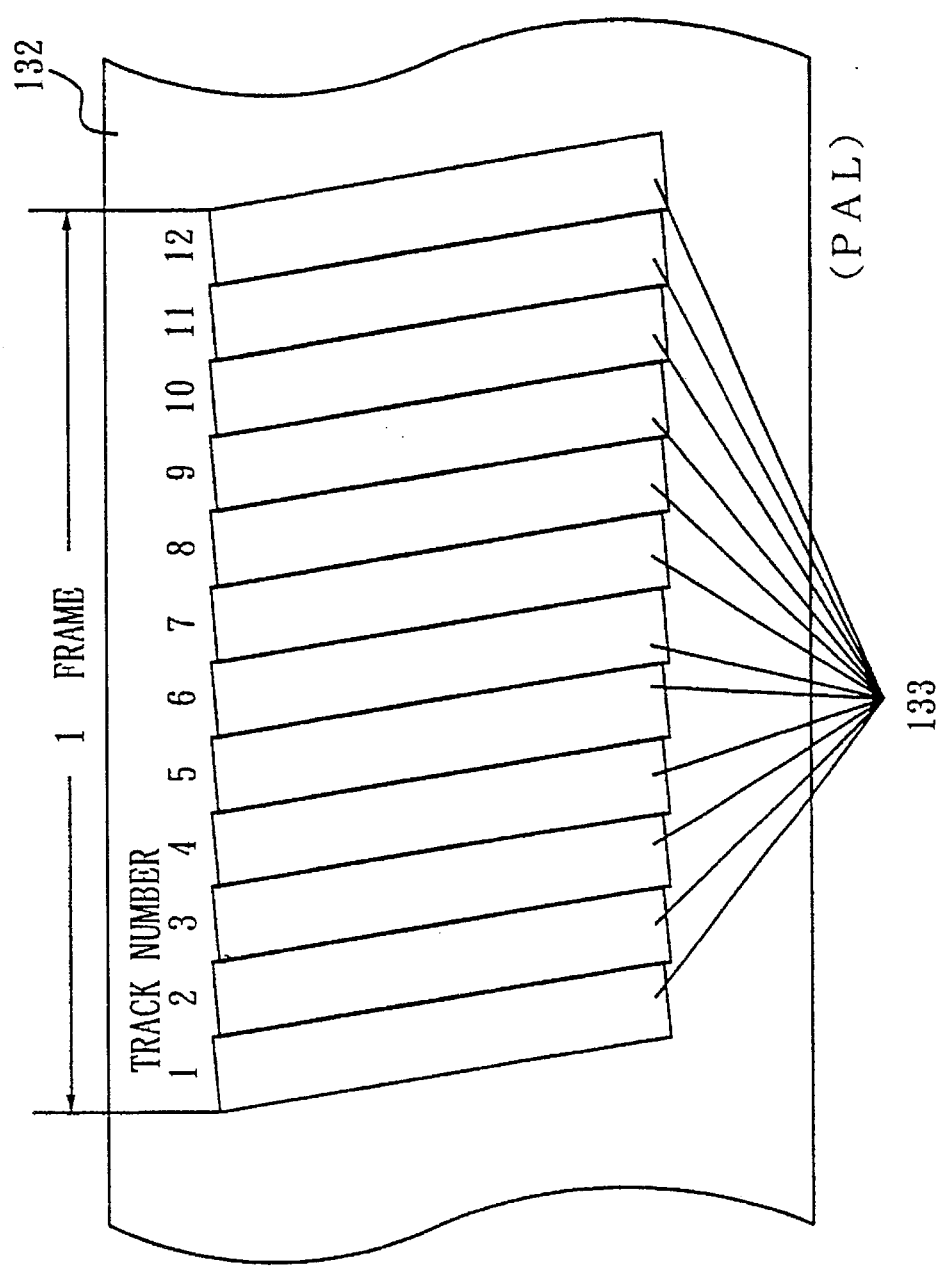
FIG.14 is a plan view of the a magnetic tape representing video tracks of one frame in the PAL standard in the third embodiment of the digital recording and reproducing apparatus of the present invention.

FIG.14 is a plan view of the magnetic tape 132 illustrating twelve tracks of one frame. The video signal of one frame is recorded in the video area of the twelve tracks 133 on the magnetic tape 132. The arrangement of the SYNC block data in one track is identical with that shown in FIG.12, and the SYNC block data 1–135 are recorded in the video areas of one track along the length of the track in the order of the number. Consequently, for example, in the rectangular block 71, the main component of the coded data of the macro block C1 is recorded in the track of the track number "1" as the SYNC block data 1; and the main component of the coded data of the macro block C135 is recorded in the track of the track number "1" as the SYNC block data 135. Moreover, in the rectangular block 82, the main component of the coded data of the macro block C1 is recorded in the track of the track number "12" as the SYNC block data 1, and the main component of the coded data of the macro block C135 is recorded in the track of the track number "12" as the SYNC block data 135.

[High speed reproduction in PAL standard]

The high speed reproducing operation of the video image recorded as mentioned above in the PAL standard is elucidated hereafter.

In the PAL standard, the reference speed may be selected from about ±3.8, ±4.2, ±11.5, ±12.5, ±23.5, ±24.5 or the like. A little tolerance is permissible in the reference speed. For example, +11.5 of the reference speed is selected, the speed information of the reference speed +11.5 is read out from the reference speed memory circuit 24, and is applied to the speed control circuit 25. In a similar manner to that of the NTSC standard, the tape speed is controlled to the reference speed +11.5. Subsequent reproducing operation is similar to that of the NTSC standard, and is elucidation is omitted.

[Fourth embodiment (Reproducing operation by four head elements)]

In the digital recording and reproducing apparatus in accordance with the present invention, a reproducing head having four head elements (hereinafter referred to as combination head) is usable to reproduce the data from the magnetic tape. In the combination head, a head assembly is composed of very closely spaced two head elements, and two head assemblies are mounted on the rotating mechanism with 180° of central angle. The high speed reproducing operation using the combination head is elucidated with respect to the NTSC standard.

In the case of 9000 rpm of the rotating speed of the reproducing head, the reference speed may be selected from ±4.5, ±5.5, ±9.0, ±11, ±19.0, ±21.0.

In general, a reference speed in the combination head helical scanning system at 9000rpm of rotating speed is represented by $$\pm[(t\pm1)/N], \text{ and } \pm[(S\times t\pm1)],$$

where, N and S are natural number, and t is the number of tracks in which the data of one frame is recorded.

Figure 22:
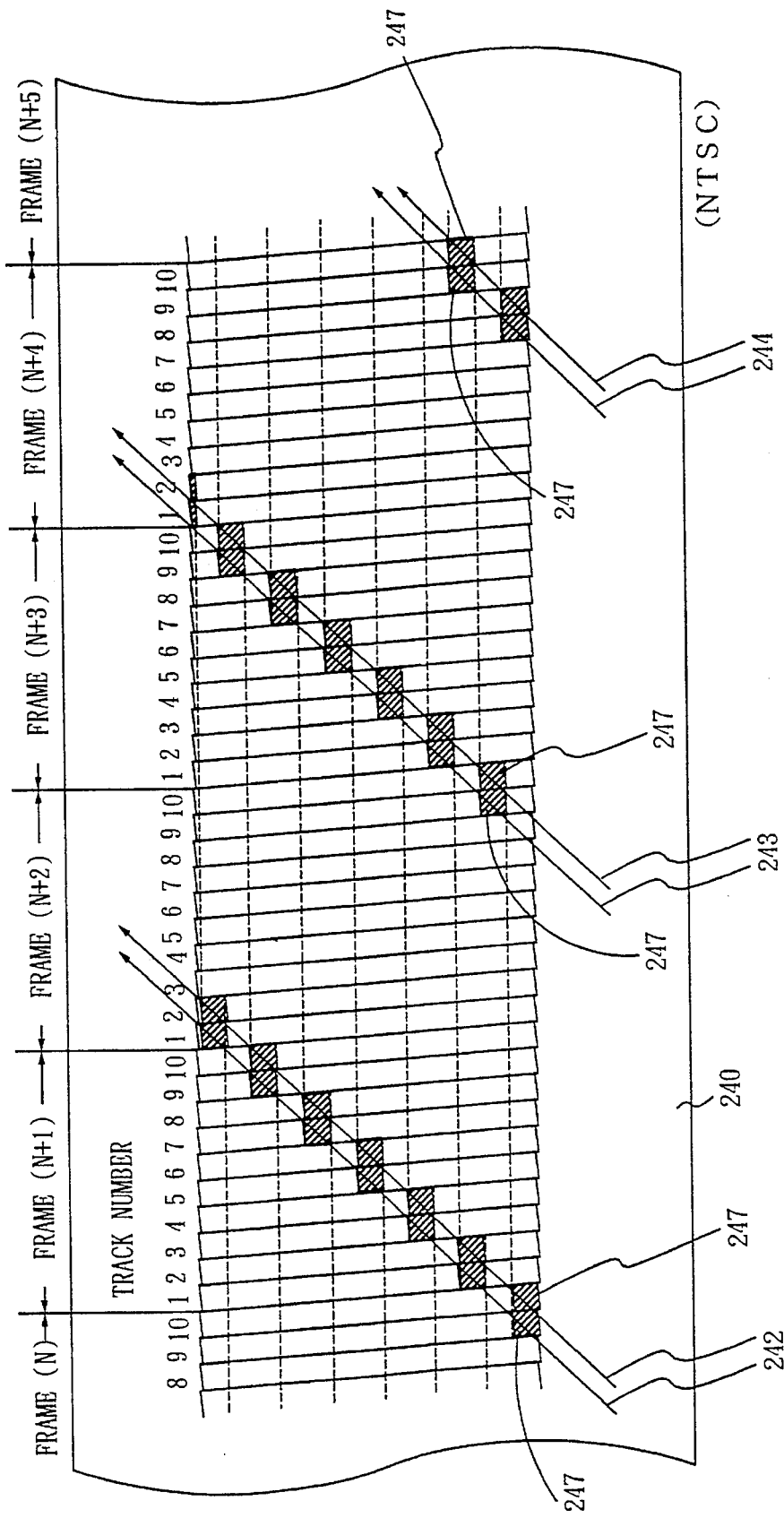
FIG.22 is a plan view of a video tape representing regions of the video tracks which are reproduced by the reproducing head elements in the high speed reproduction in the fourth embodiment.

For example, when the reference speed (+19.0)is selected, the regions which are reproduced by the head elements are formed as shown in FIG.22. Referring to FIG.22, the reference speed is set to +19.0. Two head elements scans simultaneously neighboring two tracks, and thus data of two regions 247 are simultaneously reproduced. Consequently, the amount of data which is reproduced by one scanning operation of the combination head is twice of that of the reproducing head having two head elements.

Figure 23:
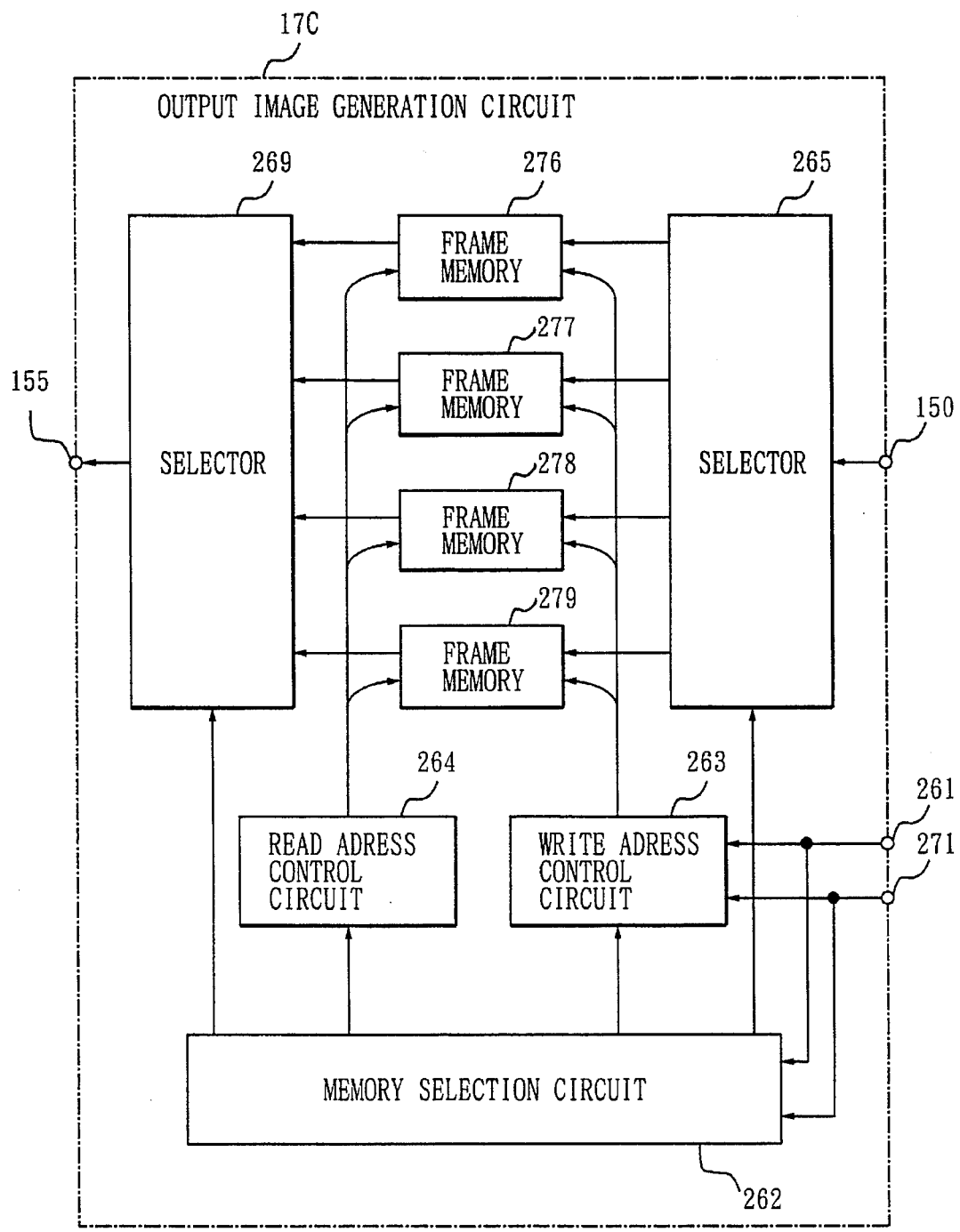
FIG.23 is a block diagram of the output image generation circuit of a fourth embodiment of the digital recording and reproducing apparatus in accordance with the present invention.

The operation of an output image generation circuit 17C of a fourth embodiment shown in FIG.23 is elucidated with respect to the reproduced data by the combination head. The output image generation circuit 17C comprises four frame memories 276, 277, 278, and 279. Reproduced SYNC block data is input to a selector 265 through a terminal 150, and the SYNC block ID is input to a write address control circuit 263 and a memory selection circuit 262. Moreover, a speed information signal is applied to the write address control circuit 263 and the memory selection circuit 262, the operation of the output image generation circuit 17C is represented by the flowcharts shown in FIG.9(*a*) and FIG.9(*b*). Thus, the operation of the output image generation circuit is similar to the operation of the output image generation circuit 17B shown in FIG.18.

Figure 24:
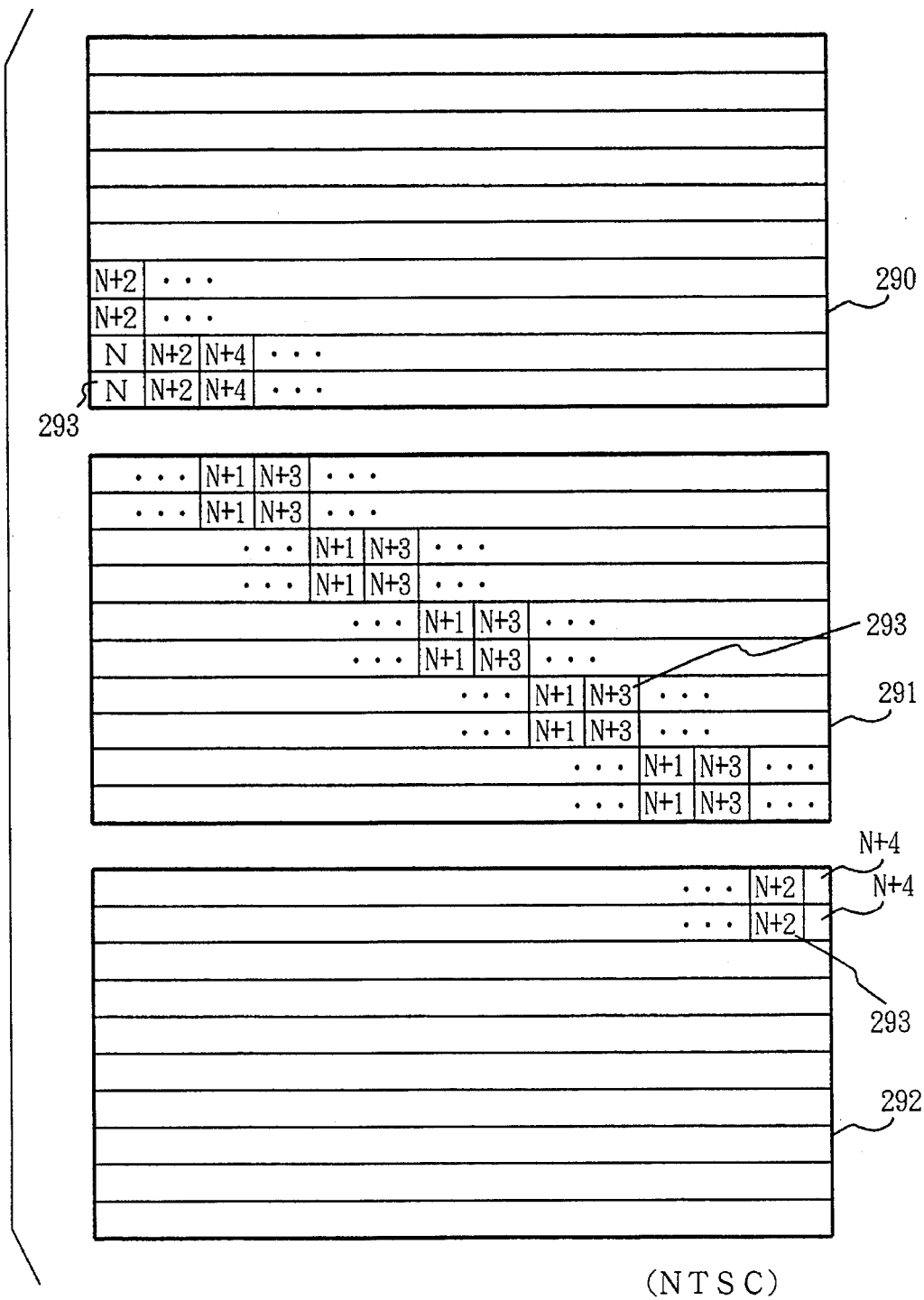
FIG.24 is a diagram representing the data arrangement in the frame memories of the output image generation circuit of the fourth embodiment.

FIG.24 is a diagram representing the status of the frame memories 276,277 and 278 in write-in operation of the reproduced SYNC block data. As shown in FIG.24, the reproduced data 293 are written in the memory areas 290, 291 and 292 of the frame memories 276,277 and 278, respectively. The frame memory 279 is in read-out operation. In the diagram, the reproduced data 293 are represented by the frame numbers N, N+1, N+2, . . . of the recorded data on the magnetic tape 240 shown in FIG.22.

FIG.25 is a timing chart representing changing of write operation and read operation in the frame memories 276, 277, 278 and 279. The reproduced data are written in or read out in compliance with the timing shown in FIG.25, so that the reproduced data are arranged on the video image in the order shown in FIG.24. Namely, in the output video image, the reproduced data are arranged from one end to the other end of the video image in the horizontal direction in the order reproduced from the magnetic tape with a time interval of two frames. Moreover, in the vertical direction, the reproduced data are arranged from an end to the other end of the video image in the order reproduced from the magnetic tape.

Consequently, the output video image is formed by the data having a relatively reduced time shift between the neighboring two data from one end to the other end of the video image in the horizontal direction and the vertical direction. Consequently, the image quality in the high speed reproduction is greatly improved.

In the output image generation circuits 17B and 17C shown in FIG.18 and FIG.23, respectively, the number of the frame memory for writing are identical with the number of frames which are reproduced by one scanning of the reproducing head. The number of the frame memory for writing may be smaller than the number of the frame memories which are reproduced by one scanning of the reproducing head. In the above-mentioned case, a similar output video image may be formed by applying a similar data processing operation to the reproduced data.

For example, in the case that the output video image is produced by using two frame memories, one of frame memory is used for write operation and the other is used for read operation. Only reproduced data which are arranged from one end to the other end of the video image in the order reproduced from the magnetic tape are written in the frame memory for write operation. When the frame memory for write operation is filled with the reproduced data corresponding to one frame, the frame memory for write operation is changed to read operation. Consequently, two frame memories are alternately switched for the write operation or the read operation. In this case, flicker is liable to be generated in the output video image.

In the high speed producing operation shown in FIG.22 of the fourth embodiment, the reproduced data are written in the three frame memories for write operation as shown in FIG.23. Apart from the above, even if the reproduced data are applied to an output image generation circuit having two write frame memories, for example, a similar result is obtainable except for the disadvantage of the flicker. Therefore, there is no relationship between the number of frame memory and reproducing condition such as configuration of reproducing head or the tape running speed.

In the above-mentioned embodiments, the tape running speed is selected such that the tracks having the same track number, which are scanned by the reproducing head, are shifted along the head scanning direction, namely along the direction from the SYNC block number "1" to the SYNC block number "135". On the contrary, the tape running speed may be selected such that the reproduced data are shifted along the reverse direction of the head scanning direction.

For example, in the case that the recorded video data of the NTSC standard is reproduced by the high speed reproducing operation at the reference speed +10.5 by two reproducing head elements rotating at 9000 rpm, the regions which are reproduced by the head elements of the tracks having the same track number are shifted to the direction of the data arrangement from the SYNC block data "135" to the SYNC block data "1". In this case, the same data processing operation as that in the reference speed ±9.5 is applicable, and thereby a similar output video image is obtainable.

Incidentally, as to a tolerance of the reference speed, in the case of high speed reproduction operation using the rotary head having two head elements rotating at 9000 rpm in the NTSC standard, the reference speed +9.6 is usable instead of the reference speed +9.5. In this case, a similar output video image is obtainable by the same data processing as the reference speed +9.5.

When the reference speed is lower than about 5.5, a time period for tracing the tracks having the same track number becomes a time length corresponding to several scanning operation of the rotary head. In this case, the reproduced data may be arranged on the video image in the order reproduced by the magnetic tape. Consequently, the output video image is formed by the data having a relatively reduced time shift between the neighboring two data from one end to the other end of the video image in the horizontal direction and the vertical direction. Consequently, the image quality in the high speed reproduction is greatly improved.

In the above-mentioned embodiments, the main component of the coded data of one frame is recorded in ten video tracks in the NTSC standard or in twelve video tracks in the PAL standard of the magnetic tape. In a further embodiment, the main component of the coded data of the entire macro block of one frame may be recorded in less that 10 video tracks. For example, the video image of one frame is divided into two portions, and the main components of the coded data of the macro blocks in each portion are recorded in one video track in the order of the macro block number. In the reproducing operation, the reference speed is set to +9.5, and the reproduced data from two video tracks are output. Consequently, mixture of the reproduced data at different time is reduced, and a visible video image may be reproduced in the high speed reproducing operation.

The macro block in the above-mentioned embodiments is not limited to the block structure shown in FIG.3 and FIG.6. Therefore, the macro block may be formed by a first arbitrary number of pixel in the horizontal direction, a second arbitrary number of pixel in the vertical direction and a third arbitrary number of field.

Incidentally, the number of tracks for recording the video data of one frame is not limited to ten tracks (of NTSC) or twelve tracks (of PAL). In the present invention, the reference speed is changed in compliance with the number of tracks for recording the video data of one frame. Even in the above-mentioned case, the reproduced data are arranged in the video image in the order of the frame number of the video tape by a similar configuration of the present invention. In the above-mentioned embodiments, the application is directed to the standard television signal such as NTSC standard or PAL standard. In the HDTV system having 1125 scanning lines, one frame is divided into twenty rectangular blocks, and the video data of one frame is recorded in twenty tracks on a magnetic tape. The reference speed is set in compliance with the structure of the reproducing head, and thereby a high quality produced image which is similar to the embodiment of the present invention is realizable in the high speed reproducing operation.

[Fifth embodiment]

Figure 26A:
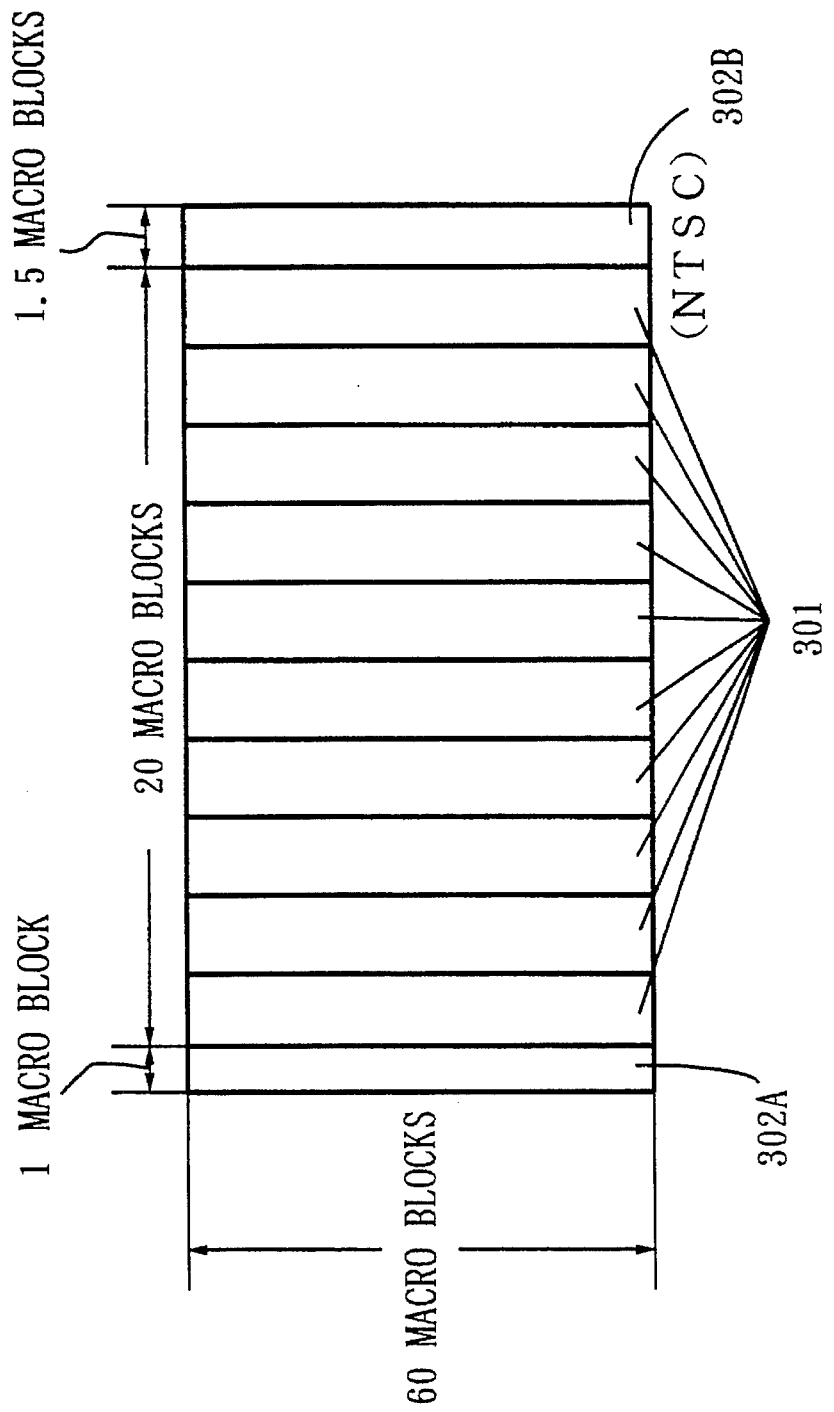
FIG.26(a) is a diagram representing the rectangular blocks in the NTSC standard by which the video image is divided into plural rectangular blocks in the horizontal direction of the video image in a fifth embodiment of the digital recording and reproducing apparatus in accordance with the present invention.
Figure 26B:
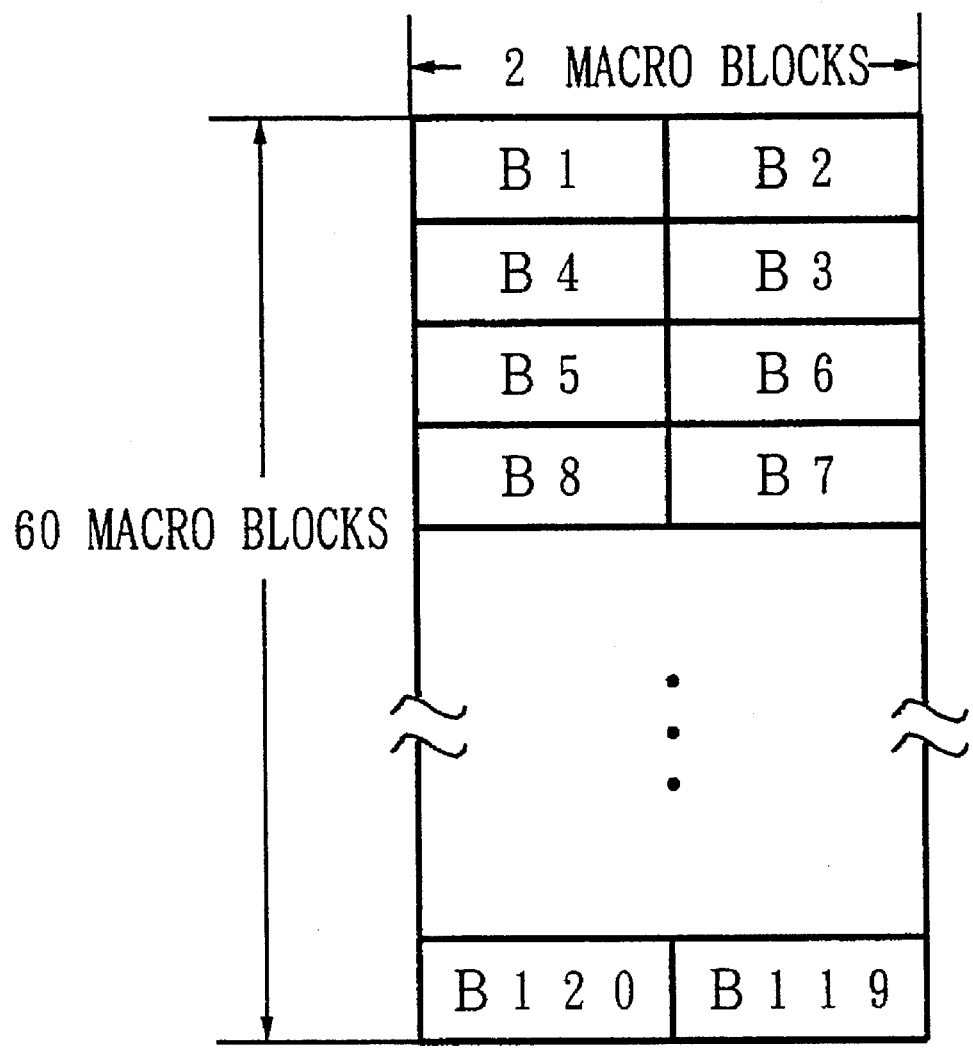
FIG.26(b) is a diagram representing the arrangement of macro blocks in the rectangular block shown in FIG.26(a)

The division of one frame is not limited to the division shown in FIG.4. For example, the video image of one frame may be divided into ten rectangular blocks in the horizontal direction as shown in FIG.26(a). In this case, the entire rectangular blocks can not be formed with the same width. In the example shown in FIG.26(a), the central portion of the video image is divided into ten rectangular blocks 301 having the width of two macro blocks, and the left end part is formed by a rectangular block 302A having the width of one macro block and the right end part is formed by a macro block 302B having the width of 1.5 macro block. Arrangement of macro blocks B1– B119 in the rectangular blocks 301 is shown in FIG.26(b).

Figure 27:
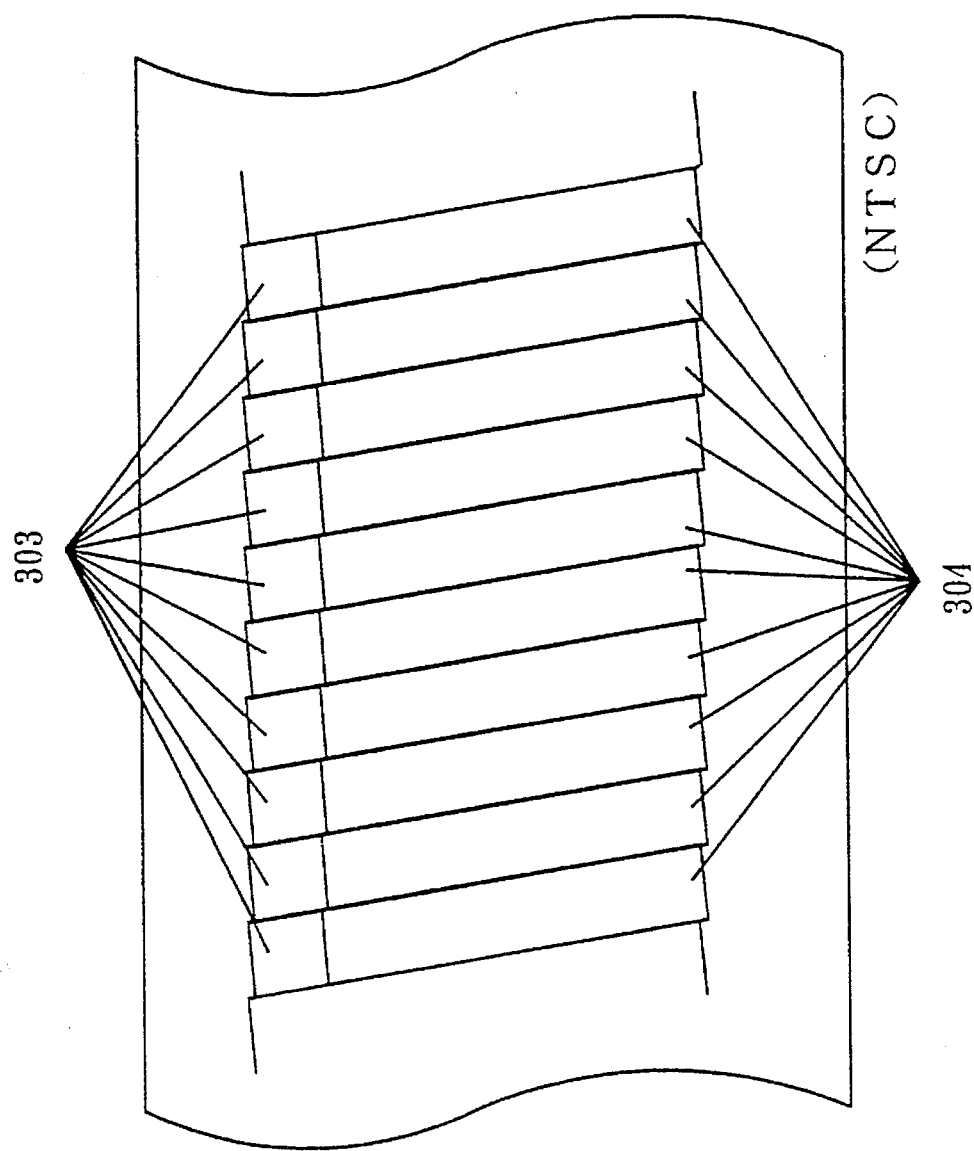
FIG.27 is a plan view of a magnetic tape representing video tracks of one frame in the fifth embodiment.

FIG.27 is a plan view of a magnetic tape representing ten tracks in which the data of the rectangular blocks shown in FIG.26(a) are recorded. Referring to FIG.26(a) and FIG.27, the data of the central rectangular blocks 301 are recorded on the areas 304 of the tracks, and the data of the end rectangular blocks 302A and 302B are recorded on the areas 303 of the tracks.

In the high speed reproduction in the fifth embodiment, the output video image mainly generated from the data of the central rectangular blocks 301.

[Sixth embodiment]

Figure 28:
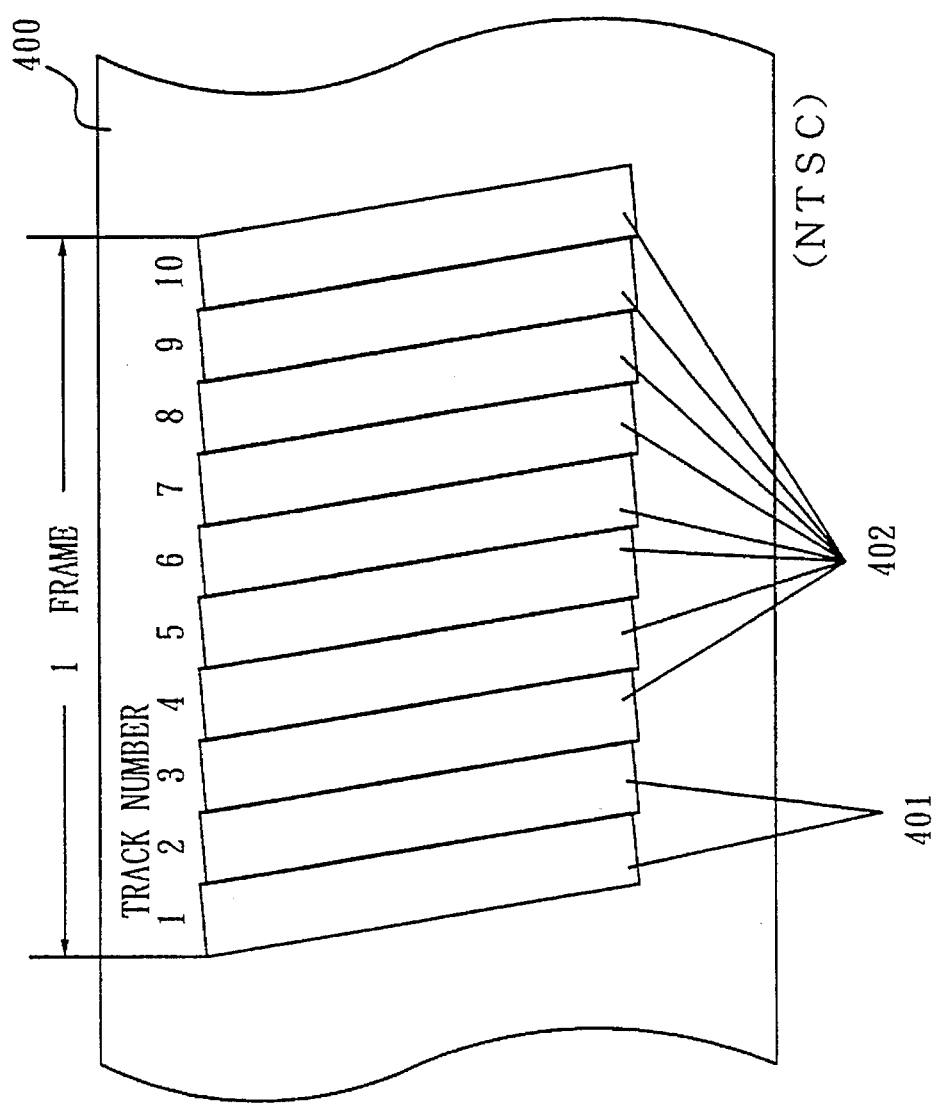
FIG.28 is a plan view of a magnetic tape representing the video tracks of one frame in a sixth embodiment of the digital recording and reproducing apparatus in accordance with the present invention.

FIG.28 is a plan view of the magnetic tape representing arrangement of the tracks in the sixth embodiment of the digital recording and reproducing apparatus in accordance with the present invention. In the sixth embodiment, the video image of one frame is divided into two rectangular blocks (not shown). In the recording operation, the ratio of the number of the SYNC block data including the main components of the coded data corresponding to the macro blocks in each rectangular block to the number of the SYNC block data including other data than the main component is set 1:4. Because the video image is divided into two rectangular blocks, the SYNC block data including the main component of each rectangular blocks are recorded in two tracks 401 (track number 1 and 2) as shown in FIG.28. The SYNC block data including other component except for the main component is recorded in other tracks 402.

In the high speed reproducing operation of the SYNC block data recorded as mentioned above, the output video image is generated only by the reproduced data of the two tracks 401. The data processing operation for generating the output video image in the sixth embodiment is similar to that of the above-mentioned embodiments.

In the sixth embodiment, since the output video image is obtained on the basis of the data reproduced from only two tracks, the amount of data is reduced, and hence the reproduction of a video image having high quality can not be expected. However, since the video image is divided into two rectangular blocks, there is only one boundary in the reproduced video image, and thus dislocation in the video image is greatly reduced.

[Seventh embodiment]

Figure 29:
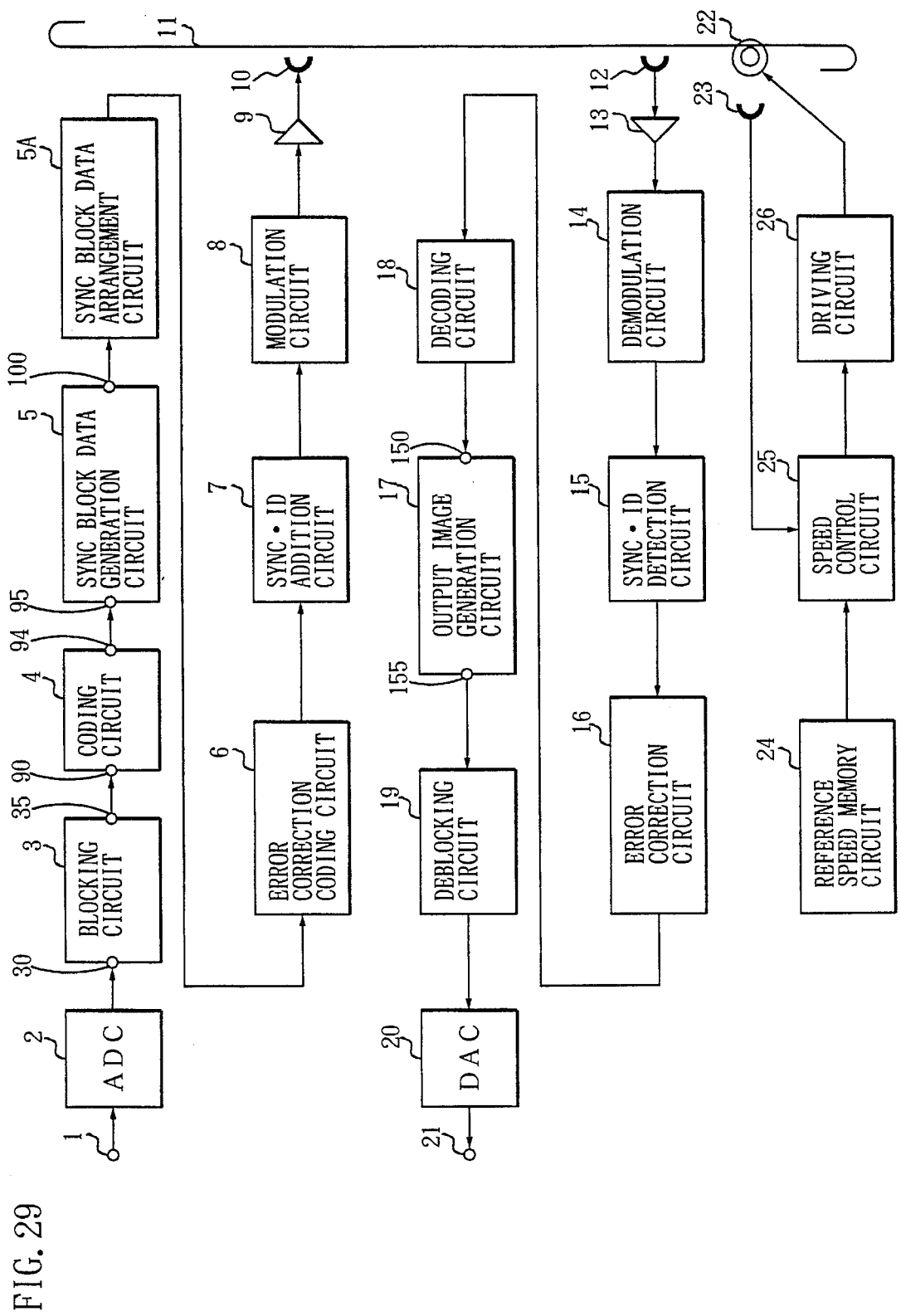
FIG.29 is a block diagram of a seventh embodiment of the digital recording and reproducing apparatus, in accordance with the present invention.

In the digital recording and reproducing circuit shown in FIG.1, the decoding circuit 18 may be placed before the output image generation circuit 17 as shown in FIG.29. The output image generation circuit 17 may be combined in the deblocking circuit 19. Consequently, the memories in the output image generation circuit 17 and the deblocking circuit 19 are used in common, and the circuiting is simplified.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for recording and reproducing a digital video signal comprising:

blocking means for converting video data to macro block data comprising a first predetermined number of data of pixels in a horizontal direction and a second predetermined number of data of pixels in a vertical direction of a video image;

coding means for converting said macro block data to macro block coded data by data compression;

synchronizing block data generation means for generating synchronizing block data including a main component of said macro block coded data;

synchronizing block data arrangement means for dividing a video image of one frame into a predetermined number of rectangular blocks, and for arranging said synchronizing block data including said main component of said macro block coded data corresponding to a macro block in said rectangular blocks in a predetermined order from one end of said video image to another end thereof along a length of said rectangular block;

recording means for recording said synchronizing block data of one of said rectangular blocks arranged in said predetermined order in video areas of one track of a magnetic tape running at a first running speed that said synchronizing block data of each rectangular block attached with a rectangular block number in said predetermined number of rectangular blocks of said one frame are recorded in said video areas of respective tracks attached with track numbers in one-to-one correspondence to said rectangular block numbers, said tracks being formed in parallel on said magnetic tape;

reproducing means comprising a reproducing head for scanning said tracks of said magnetic tape for reproducing said recorded synchronizing block data;

magnetic tape running speed control means for controlling a running speed of said magnetic tape at a second running speed having a predetermined ratio with respect to said first running speed, said second speed being a running speed at which areas on said tracks having a same track number in successive plural frames formed on said magnetic tape scanned by said reproducing head are shifted in a predetermined direction in every successive frame;

output image generation means comprising memory means for storing said synchronizing block data reproduced from said magnetic tape driven at said second running speed and read address control means for reading out said stored synchronizing block data with a predetermined timing;

decoding means for decoding said synchronizing block data and converting to said macro block data; and deblocking means for converting said macro block data to video data.

2. An apparatus for recording and reproducing a digital video signal in accordance with claim 1, wherein said synchronizing block data arrangement means provides an arrangement which divides said video image of one frame into said predetermined number of rectangular blocks in said vertical direction, and said synchronizing block data including said main components of said macro block coded data corresponding to the macro blocks in each rectangular block are arranged so as to be recorded in one track in a manner such that a first macro block is placed at a corner in each rectangular block, a first set of successive plural macro blocks are arranged in said vertical direction from said first macro block, a first subsequent macro block after said first set of successive plural macro blocks is arranged in said horizontal direction proximate to a final macro block in said first set of successive plural macro blocks, a second set of successive plural macro blocks are arranged in said vertical direction from said first subsequent macro block, a second subsequent macro block after said second set of successive plural macro blocks is arranged in said horizontal direction proximate to a final macro block in said second set of successive plural macro blocks, and the arrangement being repeated so as to arrange all of said macro blocks in one of said rectangular blocks.

3. An apparatus for recording and reproducing a digital video signal in accordance with claim 1, wherein said synchronizing block data arrangement means provides an arrangement which divides said video image of one frame into said predetermined number of rectangular blocks in said horizontal direction, said synchronizing block data including said main components of said macro block coded data corresponding to said macro blocks in each rectangular block are arranged so as to be recorded in one track in a manner such that a first macro block is placed at a corner in each rectangular block, a first set of successive plural macro blocks are arranged in said horizontal direction from said first macro block, a first subsequent macro block after said first set of successive plural macro blocks is arranged in said vertical direction proximate to a final macro block in said first set of successive plural macro block, a second set of successive plural macro blocks are arranged in said horizontal direction from said first subsequent macro block, a second subsequent macro block after said second set of successive plural macro block, is arranged in said vertical direction proximate to a final macro block in said second set of successive plural macro block, and the arrangement being repeated so as to arrange all of said macro blocks in one of said rectangular blocks.

4. An apparatus for recording and reproducing a digital video signal in accordance with claim 1, wherein said synchronizing block arrangement means divides said video image of one frame into a central part and end part, divides said central part into a predetermined number of rectangular blocks, sets first areas of a predetermined number of tracks of said magnetic tape in which the main component of said macro block coded data corresponding to said macro block in said central part are recorded and a second area of said magnetic tape in which synchronizing block data including said main component of said macro block coded data corresponding to said macro blocks in said end part are recorded, and arranges said synchronizing block data including said main component of said macro block coded data corresponding to said macro block of one rectangular block in said rectangular block from one end of said one rectangular block to another end of said one rectangular block along a length thereof in a manner such that said arranged synchronizing block data are recorded in one track of said first area of said magnetic tape, and said synchronizing block data of a predetermined number of said rectangular blocks are recorded in said predetermined number of tracks arranged in parallel on said magnetic tape.

5. An apparatus for recording and reproducing a digital video signal comprising:

blocking means for converting video data to macro block data comprising a first predetermined number of data of pixels in a horizontal direction and a second predetermined number of data of pixels in a vertical direction of a video image;

coding means for converting said macro block data to macro block coded data by data compression;

synchronizing block data generation means for generating a first synchronizing block data including a main component of said macro block coded data, and for generating a second synchronizing block data including a component of said macro block coded data other than said main component;

synchronizing block data arrangement means for dividing a video image of one frame into a third predetermined number of rectangular blocks and for arranging said synchronizing block data including said main component of said macro block coded data corresponding to said macro block in each of rectangular blocks in a manner such that said first synchronizing block data is recorded in video areas of one track on said magnetic tape in a predetermined order from one end to other end of said video image along a length of said rectangular blocks, said second synchronizing block data is recorded in a video area of a fourth predetermined number of tracks and said video data of said one frame is recorded in video areas of the tracks of a number corresponding to a sum of said third predetermined number and said fourth predetermined number;

recording means for recording said synchronizing block data of one of said rectangular blocks arranged in said predetermined order in video areas of one track of a magnetic tape running at a first running speed so that said synchronizing block data of each rectangular block attached with a rectangular block number in said third predetermined number of rectangular blocks of said one frame are recorded in said video areas of respective tracks attached with track numbers being in one-to-one correspondence to said rectangular block numbers, which are formed in parallel on said magnetic tape;

reproducing means comprising a reproducing head for scanning said tracks of said magnetic tape for reproducing said recorded synchronizing block data;

magnetic tape running speed control means for controlling running speed of said magnetic tape at a second running speed having a predetermined ratio with respect to said first running speed, said second running speed being a running speed at which areas on said tracks having a same track number in successive plural frames formed on said magnetic tape scanned said reproducing head are shifted in a predetermined direction in every successive frames;

output image generation means comprising memory means for storing said synchronizing block data reproduced from said magnetic tape by write address control means, said magnetic tape being driven at said second running speed, and read address control means for reading out said stored synchronizing block data with a predetermined timing;

decoding means for decoding said synchronizing block data and converting to said macro block data; and deblocking means for converting said macro block data to video data.

6. An apparatus for recording and reproducing a digital video signal in accordance with claim 1 or 5, wherein said main component of said macro block coded data comprises data of a low frequency component in said macro block coded data and a predetermined additional information which is required to decode said macro block coded data.

7. An apparatus for recording and reproducing a digital video signal in accordance with claim 1 or 5, wherein said recording means comprises means for attaching identification data having a track number of said magnetic tape in which said synchronizing block data is recorded to said synchronization block data, and a synchronizing block number for identifying a position of said synchronizing block data in said track.

8. An apparatus for recording and reproducing a digital video signal in accordance with claim 1 or 5, wherein said deblocking means comprises said output image generation means.

9. An apparatus for recording and reproducing a digital video signal in accordance with claim 1 or 5, wherein said output image generation means comprises:

plural frame memories;

selection means for selecting one frame memory for write operation from said plural frame memories for every synchronization block data and for selecting a frame memory for performing a read operation from said plural frame memories based on identification data having a track number of said magnetic tape in which said synchronization block data is recorded, and a synchronization block number for identifying a position of said synchronization block data in said track;

write address control means for designating a write address in said plural frame memories; and read address control means for designating a read address in said plural frame memories.

10. An apparatus for recording and reproducing a digital video signal in accordance with claim 9, wherein said selection means comprises:

write memory selection means, in a case where said reproducing head scans plural frames for detecting whether each synchronizing block data reproduced by one scanning operation by said reproducing head is reproduced from the same frame by determining said track number and synchronizing block data number in said identification data of said synchronizing block data, and for selecting said write frame memory for said write operation from said plural frame memories based on said each detected synchronizing block data; and read memory selection means for changing a read memory from said plural frame memories at a predetermined timing after detection of a predetermined combination of said track number and said synchronizing block data number in said identification data of said synchronizing block data.

* * * * *